United States Patent
Wang et al.

(10) Patent No.: US 12,272,823 B2
(45) Date of Patent: Apr. 8, 2025

(54) POLYMER BINDER ADDITIVES FOR ELECTRODES

(71) Applicant: A123 Systems LLC, Novi, MI (US)

(72) Inventors: Lixin Wang, Belmont, MA (US); Chloe Harrison, Billerica, MA (US); Derek C. Johnson, Fort Collins, CO (US)

(73) Assignee: A123 SYSTEMS LLC, Novi, MI (US)

( * ) Notice: Subject to any disclaimer, the term of this patent is extended or adjusted under 35 U.S.C. 154(b) by 832 days.

(21) Appl. No.: 17/269,949

(22) PCT Filed: Aug. 28, 2019

(86) PCT No.: PCT/US2019/048648
§ 371 (c)(1),
(2) Date: Feb. 19, 2021

(87) PCT Pub. No.: WO2020/047153
PCT Pub. Date: Mar. 5, 2020

(65) Prior Publication Data
US 2021/0202948 A1 Jul. 1, 2021

Related U.S. Application Data

(60) Provisional application No. 62/726,139, filed on Aug. 31, 2018.

(51) Int. Cl.
*H01M 4/62* (2006.01)
*H01M 4/04* (2006.01)
*H01M 10/0525* (2010.01)

(52) U.S. Cl.
CPC ......... *H01M 4/621* (2013.01); *H01M 4/0404* (2013.01); *H01M 10/0525* (2013.01)

(58) Field of Classification Search
None
See application file for complete search history.

(56) References Cited

U.S. PATENT DOCUMENTS

2013/0266857 A1* 10/2013 Lee .................... C08G 73/1071
524/378

FOREIGN PATENT DOCUMENTS

JP    2002141067 A    5/2002
JP    2017130451 A    7/2017
(Continued)

OTHER PUBLICATIONS

Shim, J. et al., "Electrochemical analysis for cycle performance and capacity fading of a lithium-ion battery cycled at elevated temperature," Journal of Power Sources, vol. 112, No. 1, Oct. 24, 2002, 10 pages.
(Continued)

*Primary Examiner* — Yoshitoshi Takeuchi
(74) *Attorney, Agent, or Firm* — McCoy Russell LLP

(57) ABSTRACT

A binder for an electrode is provided herein. In one example, the electrode may include a current collector, and an electrode coating layer, the electrode coating layer including an electrode active material and a binder, where the binder may comprise an aromatic polyamide-based compound, and the binder may be present at greater than 0 wt % and less than or equal to 30 wt % of the electrode coating layer. In one example, the binder provides stronger cohesion between particles of the electrode active material. Methods and systems are further provided for fabricating the electrode including the binder.

10 Claims, 10 Drawing Sheets

(56) References Cited

FOREIGN PATENT DOCUMENTS

KR          20180006410 A      1/2018
WO           2014051067 A1     4/2014

OTHER PUBLICATIONS

Lee, J. et al., "Effect of Carboxymethyl Cellulose on Aqueous Processing of Natural Graphite Negative Electrodes and their Electrochemical Performance for Lithium Batteries," Journal of the Electrochemical Society, vol. 152, No. 9, Jul. 21, 2005, 7 pages.

Mazouzi, D. et al., "Silicon Composite Electrode with High Capacity and Long Cycle Life," Electrochemical and Solid-State Letters, vol. 12, No. 11, Aug. 28, 2009, 4 pages.

Ryou, M. et al., "Mussel-Inspired Adhesive Binders for High-Performance Silicon Nanoparticle Anodes in Lithium-Ion Batteries," Advanced Materials, vol. 25, No. 11, Dec. 27, 2012, 6 pages.

Shi, Y. et al., "Energy Gels: A Bio-Inspired Material Platform for Advanced Energy Applications," Nano Today, vol. 11, No. 6, Dec. 2016, 73 pages.

Shi, Y. et al., "Material and Structural Design of Novel Binder Systems for High-Energy, High-Power Lithium-Ion Batteries," Accounts of Chemical Research, vol. 50, No. 11, Oct. 5, 2017, 11 pages.

ISA Korean Intellectual Property Office, International Search Report and Written Opinion Issued in Application No. PCT/US2019/048648, Dec. 18, 2019, WIPO, 11 pages.

International Bureau of WIPO, International Preliminary Report on Patentability Issued in Application No. PCT/US2019/048648, Mar. 2, 2021, WIPO, 7 pages.

\* cited by examiner

POLYMER BINDER ADDITIVES FOR ELECTRODES

CROSS REFERENCE TO RELATED APPLICATIONS

The present application is a U.S. National Phase of International Application No. PCT/US2019/048648, entitled "POLYMER BINDER ADDITIVES FOR ELECTRODES," filed on Aug. 28, 2019. International Application No. PCT/US2019/048648 claims priority to U.S. Provisional Application No. 62/726,139, entitled "APPLICATION OF POLY-P-BENZAMIDE AS AN ELECTRODE ADDITIVE TO ENHANCE ELECTROCHEMICAL, MECHANICAL, AND SAFETY PROPERTIES," filed Aug. 31, 2018. The entire contents of each of the above-identified applications are hereby incorporated by reference for all purposes.

FIELD

The present description relates generally to materials and methods used in secondary lithium-ion batteries.

BACKGROUND AND SUMMARY

Lithium-ion batteries have been widely used in consumer electronics, uninterruptible power supply (UPS) batteries, electric vehicles, and in other applications due to their superior performance and preferable balance of energy density, voltage range and cycle life. With the increasing consumer appetite for such lithium-ion battery applications, achieving higher energy density has become a focus of research.

Lithium-ion batteries may include, for example, a cathode active material coating with an aluminum cathode current collector, an electrolyte, a separator, an anode active material coating with a copper anode current collector, and a cell container. Among these cell components, the cathode active material and the anode active material store and release electrochemical energy during the charge and discharge processes. The separator insulates electrical contact between the anode and the cathode and allows the lithium ions to transport between the cathode and anode. Current collectors support the mechanical integrity of the electrodes and conduct the electrons to and from an external circuit. The energy density of a lithium-ion battery is calculated by dividing the energy capacity stored in the anode and cathode active materials by the total weight of all the cell components.

One approach to increase energy density in a lithium-ion battery is to increase the active material coating weight of the electrodes, so that the ratio of active material weight to the weight of all of the other cell components may be increased. Such an increase in this weight ratio increases the overall energy density of the battery. For example, the cathode coating weight of a plug-in electric vehicle is usually around 15-20 g/cc (double sided) but the coating weight is usually about 38-50 g/cc for pure electric vehicles. The batteries of pure electric vehicles, therefore, may have higher energy densities. However, high loading weights may also compromise electrode mechanical properties during the engineering process leading to such problems as electrode cracking, chipping at the edges, and weak cohesion.

To solve the problems derived from increased coating thickness, polymer binders in electrode compositions are intensively optimized. In addition to the polymer binders, the electrode components may include active materials and conductive additives. The conductive additives are used in the electrodes to enhance the conductivity of the electrode. Active materials of the electrodes from the cathode and anode store electrical energy from power sources through electrochemical reactions during the charge process, and release stored electrochemical energy to external workloads during the discharge process. During these processes, the volumetric changes of the electrodes cause stress to the active material particles and lead to electrode integrity degradation. With the loss of electrode integrity, active materials may lose contact with each other and fall off the current collector. This problem may be more prominent in thicker electrodes. The binders are used in electrodes to help bind the active material particles within the coating to each other, and also onto the current collector.

A good binder has to have good binding capability and good electrochemical stability. Many binders and electrode additives have been used in lithium-ion electrodes to enhance the binding and improve the mechanical properties thereof. Among these materials, polyvinylidene fluoride (PVDF) is the most commonly used binder. However, the van der Waals forces between PVDF and active material particles, and between PVDF and the current collectors, are not strong enough to fully protect the electrode particles against the stress caused by the volume changes in the charge and discharge processes. This inability to fully protect the electrode particles may lead to a drastic capacity fade over multiple uses of the battery.

A few non-conductive polymers have been reported to be able to potentially supplement or substitute the PVDF binder. Lee et al. reported carboxymethyl cellulose (CMC) that has been widely used in anodes to substitute or partially substitute for PVDF binder. CMC helps to anchor the binder on the active material surface to accommodate the volume change during electrochemical reactions, especially for Si-containing anodes that can have up to 400× volume expansion if fully charged. (Lee, J.; Paik, U.; Hackley, V.; Choi, Y. "Effect of Carboxymethyl Cellulose on Aqueous Processing of Natural Graphite Negative Electrodes and their Electrochemical Performance for Lithium Batteries," *Journal of the Electrochemical Society* 2005, 152, A1763-A1769.)

Mazouzi et al. reported poly(acrylic acid) (PAA) for possible replacement or substitution of PVDF as well. Both CMC and PAA have a high concentration of carboxylic groups, which provide a high elastic modulus to accommodate the volume change, and bond with the particle surface to promote formation of a stable solid electrolyte interface layer. (Mazouzi, D.; Lestriez, B.; Roue, L.; Guyomard, D. "Silicon Composite Electrode with High Capacity and Long Cycle Life," *Electrochemical and Solid-State Letters* 2009, 12, A215-A218.)

Conventional CMC and PAA are non-conductive polymers, which reduce conductivity of the electrodes so that, to maintain the conductivity of the electrodes, the amount of conductive additives has to be increased to offset the effect of the binders. Ryou et al. introduced functional groups such as catechol groups to PAA polymeric backbones to increase the conductivity of the PAA and thus minimize the impedance increase of the electrodes caused by the binder. The catechol groups also provide effective adhesion with various surfaces. (Ryou, M.-H.; Kim, J.; Lee, I.; Kim, S.; Jeong, Y. K.; Hong, S.; Ryu, J. H.; Kim, T.-S.; Park, J.-K.; Lee, H.; Choi, J. W. "Mussel-Inspired Adhesive Binders for High-Performance Silicon Nanoparticle Anodes in Lithium-Ion Batteries," *Advanced Materials* 2013, 25, 1571-1576.)

Attempts have been made to develop a processable conductive polymer gel for use as a binder, as reported by Shi et al. The interconnected network of gels may provide high electronic conductivity, and the evenly distributed pores may space the active material particles evenly. Different combinations of the aforementioned binders have also been mixed together to utilize the advantages of each and accomplish the goal of an electrode with strong mechanical properties. (Shi, Y.; Zhang, J.; Pan, L.; Shi, Y.; Yu, G. "Energy Gels: A Bioinspired Material Platform for Advanced Energy Applications," *Nano Today* 2016, 11, 738-762.)

However, the inventors herein have recognized potential issues with the aforementioned substitutions for PVDF. For example, CMC, PAA, and modified PAA and CMC may face processing difficulties, such as low viscosity. A drawback of polymer gels is that it may be hard to reach a coating density for practical energy density.

In an example herein, poly-p-benzamide, or poly(p-benzamide), (PPB) is introduced as a binder to substitute partially or wholly for the traditional PVDF binder in an electrode to provide functionalities of stronger binding through polarized bonds, and of greater electrode mechanical strength. The molecules of PPB have polarized —C(O)NH— groups that may enhance the binder force of the surfaces they attach on.

PPB can be used in cathode coatings and/or anode coatings. The polarity of the C═O groups ensures lower lowest unoccupied molecular orbital (LUMO) electronic states which may improve the polymer adhesion. This leads to increased interfacial interaction between the polymer binder and the active material particles, as well as to stronger adhesion between the electrode layer and the current collector. The addition of PPB into electrodes may significantly increase the adhesion, cohesion, and integrity of the electrodes. Moreover, the capacity, cycle life and mechanical strength of the electrodes with the PPB may be improved without increasing electrode impedance. (Shi, Y.; Zhou, X.; Yu, G. "Material and Structural Design of Novel Binder Systems for High-Energy, High-Power Lithium-Ion Batteries," *Accounts of Chemical Research* 2017, 50, 2642-2652.)

The inventors have also surprisingly found that duplicated samples of electrodes with PPB have tight, or lower variance, data in relation to each other, compared to their non-PPB additive counterparts. For example, electrodes with PPB show less variance in cycle life performance, resulting in less randomness in capacity drop, and a more consistent electrode. A battery characteristic of improved consistency may allow batteries comprising PPB to have more dependable performance over many cycles, which may allow consumers and users to save money and to use lithium-ion batteries in more applications. For example, if a lithium-ion battery is known to have decreased probability of energy density loss over many cycles, scheduled battery performance checks and battery replacements can be scheduled less often, saving money on maintenance fees and replacement costs.

In one example, an electrode may comprise a current collector, and an electrode coating layer, the electrode coating layer comprising an electrode active material and a binder, where the binder may comprise an aromatic polyamide-based compound, and the binder may be present at greater than 0 wt % and less than or equal to 30 wt % of the electrode coating layer.

In another example, a lithium-ion battery may comprise a first electrode including an electrode active material, a current collector, and an aromatic polyamide-based compound (e.g., PPB), a second electrode, and a separator disposed between the first electrode and the second electrode.

In yet another example, a method for fabricating an electrode may comprise dissolving an electrode active material in a solvent to form a mixture, adding an aromatic polyamide-based compound to the mixture, mixing the mixture to form a slurry-based coating, and layering the slurry-based coating in the electrode.

In one example, by using a PPB additive, reduction of electrode cracking, chipping during stamping, and weak adhesion issues encountered in commercial lithium-ion battery cells may be reduced. Additionally or alternatively, the capacity and cycle life of electrodes with PPB additives may also be improved without significant degradation of rate performance and direct current (DC) resistance (DCR) increase. In some examples, PPB fibers may be commercially mass-produced. In addition, the process of adding PPB additives to electrodes may not need significant extra equipment or steps other than the ones used in cell-producing processes.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
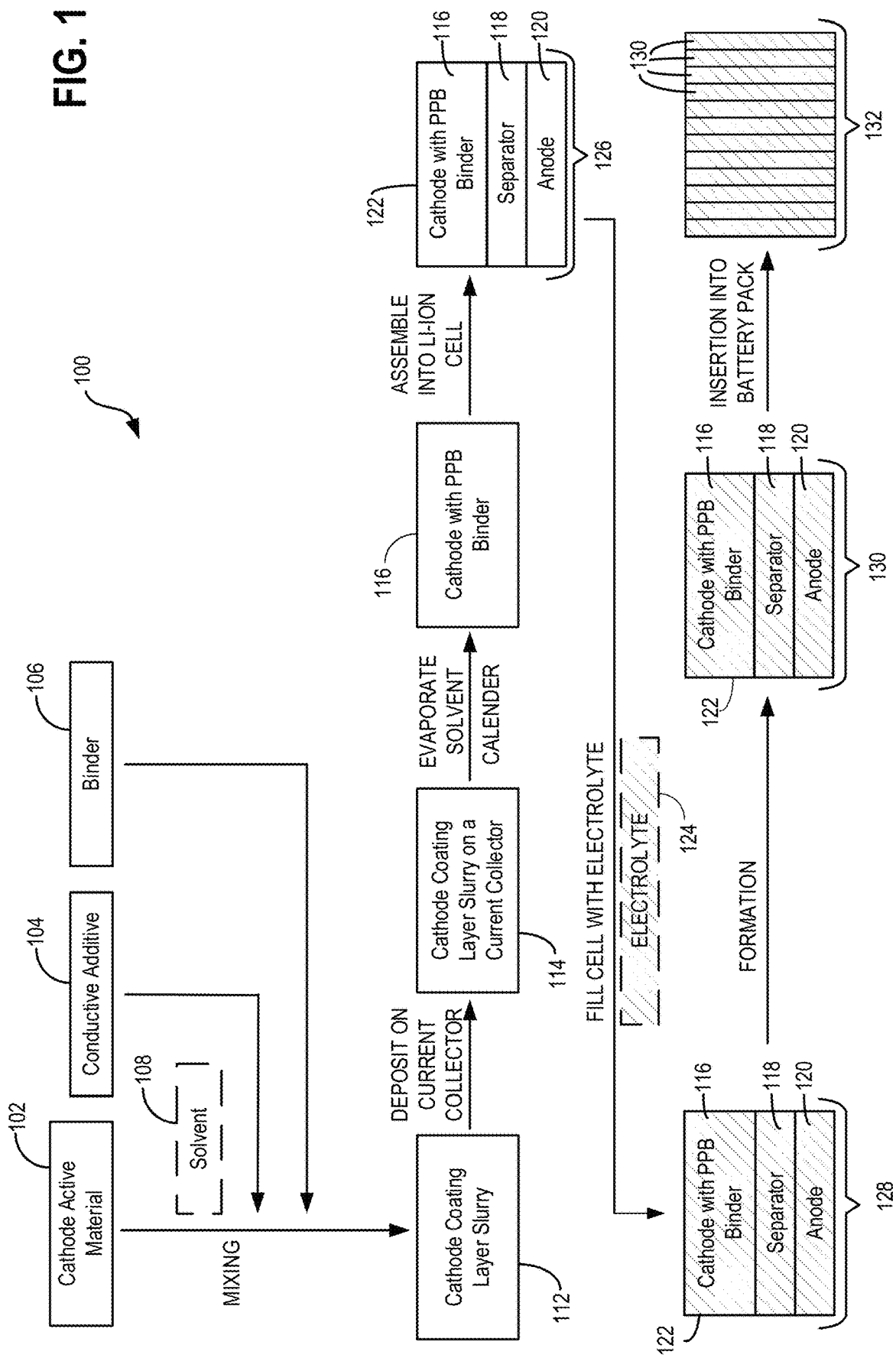
FIG. 1 shows a schematic diagram of an example method for manufacturing a lithium-ion battery pack comprising an electrode, the electrode comprising poly-p-benzamide (PPB) binder, in accordance with at least one embodiment of the present disclosure.

The present disclosure relates to materials and methods for using aromatic polyamide-based compounds, such as poly-p-benzamide, or polyp-benzamide), (PPB), as a binder in an electrode, such as a lithium-ion cathode or a lithium-ion anode. The electrodes comprising PPB may be used in lithium-ion batteries, including high-power batteries and/or high-energy density batteries, and in batteries found in electric vehicles and consumer devices. PPB may be used to substitute wholly or partially for a polyvinylidene fluoride (PVDF) binder in an electrode. As such, PPB may be used to provide stronger binding through polarized bonds. As described below with reference to FIG. 2, molecules of PPB have polarized —C(O)NH— groups that may enhance a binding force of a surface on which the molecules of PPB attach.

PPB may be used in a cathode coating, an anode coating, or both. The polarity of C=O groups therein ensures lower lowest unoccupied molecular orbital (LUMO) electronic states that may improve polymer adhesion and may improve interfacial interaction between the polymer binder and active material particles, as well as stronger adhesion between an electrode layer and a current collector. The addition of PPB into lithium-ion battery electrodes may significantly increase adhesion, cohesion, and integrity (e.g., the PPB may reduce cracking) of the electrodes. Moreover, capacity, cycle life, and mechanical strength of electrodes with added PPB may be improved without increasing electrode impedance.

For purposes of clarity and continuity, it should be appreciated that in the following description, multiple names may be used to refer to the same concept, idea, or item, and vice versa. For example, it should be understood that "polypbenzamide" or "poly(p-benzamide)" or "PPB" may be used herein to refer to all aromatic polyamide-based additives including, but not limited to, poly(phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chloro-phenyleneterephthalamide), a pheneyleneterephthalamide/2,6-chlorophenyleneterephthalamide multipolymer, poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide), and para-phenyleneterephthalamide/2,6-dichloro-para-phenyleneterephthalamide copolymer. Further, "electrode comprising PPB" or "electrode comprising PPB additives," and similar terms, may be used to refer to all electrodes that are constructed from, include, and/or use the aforementioned aromatic polyamide-based materials. Thus, an electrode referred to as "cathode with PPB additives" is a cathode that comprises PPB as an electrode binder, for example.

In addition, "high-nickel active cathode materials" may be used herein to refer to all electrochemically active cathode powders used in lithium-ion batteries including, but not limited to, $LiNi_{0.333}Co_{0.333}Mn_{0.333}O_2$ (NCM111), $LiMn_xNi_{2-x}O_4$, $LiNiPO_4$, $LiCoPO_4$, lithium nickel manganese oxide (both layered and spinel structure) or any of their precursors such as $Ni_xMn_yCo_{1-x-y}(OH)_2$ and $Ni_xCo_yAl_{1-x-y}(OH)_2$. Further, "high-nickel cathodes" may be used to refer to all cathodes that are constructed from, include, and/or use the aforementioned high-nickel active cathode materials for lithium-ion transport between a cathode and an electrolyte in a battery cell. Thus, a cathode referred to as an "NCM cathode" is a cathode that comprises $Li_aNi_xCo_yMn_{1-x-y}O_2$ (NCM) as an electrochemically active cathode material, for example.

Additionally, in the following description, numerous specific details are set forth in order to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific embodiments, it will be understood that these embodiments are not intended to be limiting.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" or "a mixture of" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Turning now to FIG. 1, a schematic 100 depicts an example process for fabricating an electrode coating layer comprising PPB binder, both in the form of a slurry and in the form of a cathode, and for fabricating a lithium-ion battery utilizing the PPB binder.

Cathode active material 102 may be an active material suitable for use in a cathode, such as a lithium intercalating compound or a lithium accepting compound. In some embodiments, cathode active material 102 may be a high-nickel active cathode material such as lithium nickel cobalt manganese oxide (NMC). For example, cathode active material 102 may have a general formula of $Li_aNi_xCo_yMn_{1-x-y}O_2$. The formula for NMC may be lithium-rich, so that a>1, or stoichiometric, so that a=1. In some embodiments, cathode active material 102 may be lithium nickel cobalt aluminum oxide (NCA), lithium nickel cobalt manganese aluminum oxide (NCMA), spinel and layered structure $LiMn_xNi_{2-x}O_4$, or another high-nickel active cathode material, and/or one or more of any of their precursors, such as $Ni_xMn_yCo_{1-x-y}(OH)_2$. In some embodiments, cathode active material 102 may be a lithium iron phosphate, a lithium metal phosphate, a lithium bimetallic phosphate, a lithium multi-metallic phosphate, or another material comprising lithium and phosphate. In some embodiments, cathode active material 102 may be another type of material, or a blend of materials, and one or more of the materials comprising cathode active material 102 may be treated or coated in various ways prior to, or after, inclusion in cathode with PPB binder, or cathode, 116. For example, cathode active material 102 may comprise one or more of NMC, NCA, NCMA, a lithium metal phosphate, and a lithium multi-metallic oxide. In some examples, other active materials may be used.

In some embodiments, cathode active material 102 may be doped with about 0.1 mol %, 0.5 mol %, 1 mol %, 1.5 mol %, 2 mol %, 3 mol %, 3.5 mol %, 4 mol %, 4.5 mol %, 5 mol %, 6 mol %, 7 mol %, 8 mol %, 9 mol %, or 10 mol % of one or more dopants.

Cathode active material 102 may be in the form of particulates, or particles. The cathode active material 102 particles may have a range of sizes or may be very close in size. The cathode active material 102 particles may have a D50 size range of 1 to 10 µm, or may be about 3 µm (D50). Cathode active material 102 may be in the form of secondary particles. In some embodiments, cathode active material 102 secondary particles may comprise agglomerations of chemically-bound, nanometer-sized primary particles.

In some embodiments, during preparation of the cathode with PPB binder 116, cathode active material 102 may be mixed with a solvent 108. The solvent may be N-methyl-2-pyrrolidinone (NMP). Other solvents may be used as known to one skilled in the art. In some embodiments, solvent 108 may be a blend of solvents. In some embodiments, solvent 108 may not be added and remaining components of cathode with PPB binder may therefore be dry mixed together.

In some embodiments, during preparation of the cathode with PPB binder 116, conductive additive 104 may be added to a mixture of cathode active material 102 and solvent 108. Conductive additive 104 may be carbonaceous. Conductive additive 104 may be a single material or a combination of materials. Conductive additive 104 may be in the form of particulates, or particles. The conductive additive 104 particles may have a range of sizes or may be very close in size. The conductive additive 104 particles may have a size (e.g., D50 size) of less than about 10 µm and greater than about 1 nm. In some embodiments, the D50 size of the conductive additive 104 particles may range from 100 nm to 10 µm. In some embodiments, the D50 size of the conductive additive 104 particles may range from 1 µm to 10 µm. In one embodiment, the D50 size of the conductive additive 104 particles may be about 3 µm. In some embodiments, the conductive additive 104 particles may be substantially round. In some embodiments, the conductive additive 104 particles may be irregularly shaped, such that the particles do not approximate common geometric shapes, and that the particles vary in shape and size relative to one another. In some embodiments, the conductive additive 104 particles may be flakes, such that the particles are approximately plate shaped. In other embodiments, the conductive additive 104 may be in the form of fibers.

Conductive additive 104 may be up to 15% of physical solids in a finally formed cathode coating layer. In some embodiments, conductive additive 104 may be 10% or less, or 5% or less of the physical solids in the cathode coating layer. In some embodiments, conductive additive 104 may be 0.05-15%, or 1-15%, or 1-10%, or 1-8%, or 1-6%, or 3-10%, or 3-8%, or 5-15%, or 5-10%, or 5-8% of the physical solids in the cathode coating layer. In one embodiment, conductive additive 104 may be 5% of the physical solids in the cathode coating layer. In some embodiments, conductive additive 104 may comprise one or more materials or compounds. The type of conductive additive 104 used is not particularly limited and may be any known by one skilled in the art. For example, conductive additive 104 may be carbon and a source thereof may comprise polyvinyl alcohol, polyvinyl butyral, sugar, or other source, or combination of sources.

In some embodiments, binder 106 may be added to the mixture of cathode active material 102, solvent 108, and conductive additive 104. Binder 106 may be a polymeric binder and may comprise poly-p-benzamide (PPB) or a blend of PPB and polyvinylidene fluoride (PVDF), for example. In some embodiments, binder 106 may comprise one or more other aromatic polyamide-based polymers, fibers, or resins in addition to, or in substitution for, PPB. As such, in some embodiments, binder 106 may comprise at least two compounds with differing compositions. As non-limiting examples, binder 106 may comprise one or more of poly(phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chlorophenyleneterephthalamide), a phenyleneterephthalamide/2,6-chlorophenyleneterephthalamide multipolymer, poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide), and para-phenyleneterephthalamide/2,6-dichloro-para-phenyleneterephthalamide copolymer. In some embodiments, binder 106 may comprise any aromatic polyamide-based material that has been chemically altered, or chemically modified, to add or remove one or more functional groups or elements.

In some embodiments, binder 106 may comprise 0.01-100% PPB, or 0.01-80% PPB, or 0.01-50% PPB, or 0.01-20% PPB, or 0.01-10% PPB, and a remainder may be PVDF or a blend of PVDF and other binders, or a blend of other binders with no PVDF. In one embodiment, binder 106 may be 30-40% PPB. In one embodiment, binder 106 may be ⅓ PPB and ⅔ PVDF. In some embodiments, PPB may be partially or wholly substituted with one or more other aromatic polyamide-based polymers, fibers, or resins. In some embodiments, binder 106 may comprise a fiber with a diameter range of a few nanometers to a few microns, and a length range of a few nanometers to hundreds of microns. For example, binder 106 may comprise a fiber with a diameter range of 3 nanometers to 3 microns, or of 1 nanometer to 5 microns. In some embodiments, binder 106 may comprise a fiber with a length range of 1 nanometers to 900 microns, or of 3 nanometers to 900 microns, or of 3 nanometers to 500 microns, or of 3 nanometers to 300 microns, or of 1 nanometer to 300 microns. In some embodiments, binder 106 may comprise a fiber with a diameter range of 1 nanometer to 10 microns, and a length range of 1 nanometer to 1,000 microns. As used herein, "few" may refer to any number less than or equal to 10.

Binder 106 may be present at greater than 0 wt % and less than or equal to 30 wt % of a finally formed cathode coating layer. As non-limiting examples, binder 106 may be 0.01-30%, or 0.01-15%, or 0.01-5%, or 0.01-3%, or 0.01-2%, or 0.01-1%, or 0.01-0.5% of the cathode coating layer. In some embodiments, binder 106 may be 1-5% or 3-5% of the cathode coating layer.

In some embodiments, cathode coating layer slurry 112 may be a mixture of cathode active material 102, solvent 108, conductive additive 104, and binder 106. Further, the cathode active material 102, the conductive additive 104, and the binder 106 may be dispersed and mixed uniformly within the cathode coating layer slurry 112. Cathode coating layer slurry 112 may have a concentration of 0.01-99% solids, or 10-90% solids, or 20-80% solids, or 30-70% solids, or 40-60% solids, or 50-60% solids. In one embodiment, cathode coating layer slurry 112 may have a concentration of about 56% solids. In some embodiments, cathode coating layer slurry 112 may not contain solvent 108 and may therefore comprise a dry mix of powdered components.

In some embodiments, components 102, 104, 106, 108 of cathode coating layer slurry 112 may be mixed in a Thinky cup or other vessel. In some embodiments, mixing may be conducted for 5 minutes or another duration of time, for example, 1 minute, 10 minutes, or 30 minutes. In some embodiments, mixing may be conducted at 2000 RPM or at another speed of mixing, such as 1000 RPM or 2500 RPM. The type of container and process of mixing used is not particularly limited and may be any known to one skilled in the art.

In some embodiments of the manufacture of an electrode with PPB binder, such as cathode with PPB binder 116, or of a battery with an electrode comprising a PPB binder, such as of Li-ion cell 130 or lithium-ion battery pack 132, cathode coating layer slurry 112 may be deposited, or cast, onto a conductive substrate (also referred to herein as a "current collector") to form cathode coating layer slurry on a current collector, or slurry-coated conductive substrate, 114. The current collector thereof may be a metal foil, such as aluminum foil. In some embodiments, the current collector may be aluminum foil and may have a thickness of 1-20 μm. In one embodiment, the current collector may be aluminum foil and may have a thickness of 10 μm. Cathode coating layer slurry 112 may be cast at a pre-determined thickness, and may be cast using a slot-die coater, a doctor blade method, or other method. Cathode coating layer slurry 112 may be cast with a drawdown applicator and may be cast on an automatic drawdown table.

In some embodiments, after cathode coating layer slurry 112 may be deposited onto a current collector to form slurry-coated conductive substrate 114, solvent 108 may be dried off, or evaporated, with gentle heating. The dried film formed therefrom may then be calendered to a pre-determined density. After evaporation of solvent 108 and calendering, cathode with PPB binder 116 may be formed. Thus, fabricating cathode with PPB binder 116 may comprise mixing cathode active material 102, conductive additive 104, and binder 106 into cathode coating layer slurry 112, coating cathode coating layer slurry 112 onto a conductive substrate to form the slurry-coated conductive substrate, drying the slurry-coated conductive substrate 114, and compressing, or calendering, the coating.

Cathode with PPB binder 116 may be suitable for assembly into Li-ion cell with PPB binder 126. The process of forming Li-ion cell with PPB binder 126 may comprise pairing cathode 116 with anode 120 with a separator 118 sandwiched in between. Anode 120 may comprise an active material comprising one or more of lithium metal, graphite, graphene, lithium tin oxide (LTO), silicon, a silicon oxide, tin, or a tin oxide. In some embodiments, anode 120 may comprise PPB additive, with or without PVDF binder, and/or one or more other aromatic polyamide polymers, fibers, or resins. Separator 118 may serve to separate anode 120 and cathode 116 so as to avoid physical contact. In one embodiment, separator 118 may have a high porosity, excellent stability in the electrolytic solution, and excellent liquid-holding properties. Exemplary materials for separator 118 may be selected from nonwoven fabric or porous film made of polyolefins, such as polyethylene and polypropylene, or ceramic-coated polymer materials. Other separator materials may be used as known to one skilled in the art.

Cathode 116, separator 118, and anode 120 may be placed within hermetically sealed cell housing 122, which may comprise a pouch or a can, or other type of housing as known to one skilled in the art.

The resulting Li-ion cell with PPB binder 126 may then be filled with electrolyte 124 to produce filled Li-ion cell 128. Electrolyte 124 may support transport of ions between cathode 116 and anode 120, and may be in intimate contact with the components in filled Li-ion cell 128. Electrolyte 124 may comprise one or more Li salts, organic solvents, such as organic carbonates, and additives. Electrolyte 124 may be present throughout filled Li-ion cell 128 and may be in physical contact with anode 120, cathode 116, and separator 118.

Filled Li-ion cell 128 may then undergo cell formation, referred to also as a first charge/discharge cycle, to form Li-ion cell, or lithium-ion battery, 130. Li-ion cell 130 may be a fully fabricated and complete battery cell that is ready for insertion for use in lithium-ion battery pack 132 in conjunction with other similarly finished Li-ion cells. Li-ion cell 130 may store energy as a chemical potential in the electrodes therein, the electrodes configured to reversibly convert between chemical and electrical energy via redox reactions.

In this way, lithium-ion battery pack 132 may be fabricated wherein binder 106 comprising PPB, for example, may be used to prepare cathode 116 of at least one Li-ion cell 130 of lithium-ion battery pack 132. In particular, lithium-ion battery pack 132 may include one or more Li-ion cells 130, wherein one or more Li-ion cells 130 may include cathode with PPB binder 116, separator 118, electrolyte 124, and anode 120. Cathode with PPB binder 116 may be prepared by first mixing cathode active material 102, solvent 108, conductive additive 104, and binder 106 to form cathode coating layer slurry 112, which may be subsequently applied to a current collector, dried, and calendered. In some embodiments, lithium-ion battery pack 132 may comprise a plurality of Li-ion cells 130, where each of the plurality of Li-ion cells 130 may be of a same configuration.

In one embodiment, lithium-ion battery pack 132 may comprise cathode 116 and complimentary anode 120, wherein lithium-ion battery pack 132 may be arranged in a device, and may further be configured for use in the device, where the device may be an electric vehicle, a hybrid-electric vehicle, a cell phone, a smart phone, a global positioning system (GPS) device, a tablet device, or a computer.

In some embodiments, the process of forming cathode with PPB binder 116 may be different than described above. In some embodiments, cathode active material 102, conductive additive 104, and binder 106 may be dry mixed to form a dry active material blend. In some embodiments, cathode coating layer slurry 112 may be dried before application onto a current collector, so as to achieve a dry active material with PPB binder powder. In some embodiments, additional additives or processes may be included or, alternatively, an additive or process may be removed or substantially altered.

In some embodiments, lithium-ion battery pack 132 with an electrode comprising PPB binder may comprise an anode with PPB binder (e.g., 120) in addition to, or instead of, cathode with PPB binder 116. In one embodiment, the anode with PPB binder may be formed in a similar manner presented for cathode with PPB binder 116, with anode active material substituting for cathode active material 102.

Figure 2:
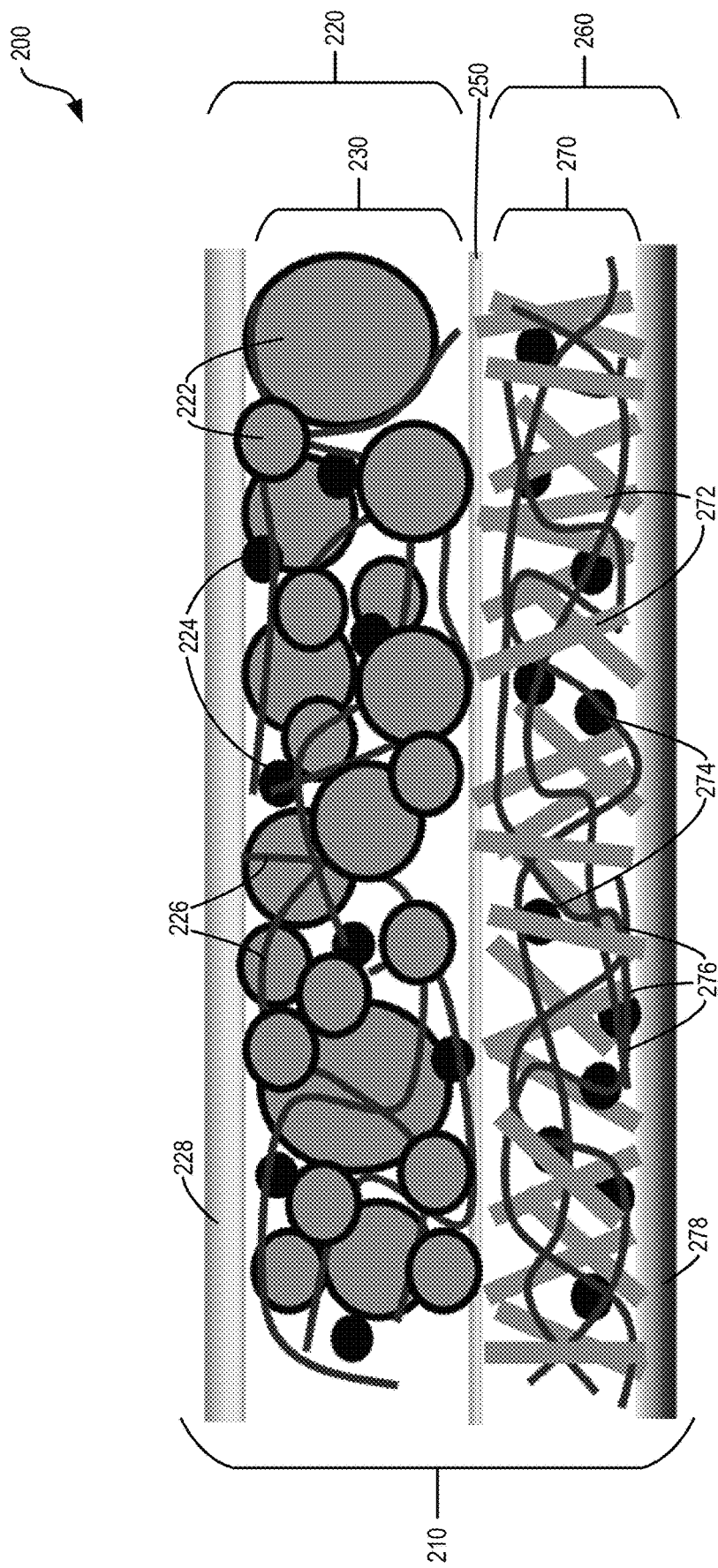
FIG. 2 shows a cutaway section of a lithium-ion battery cell comprising the PPB binder, in accordance with at least one embodiment of the present disclosure.

Turning now to FIG. 2, cutaway illustration 200 depicts lithium-ion battery cell 210. Various elements depicted in FIG. 2 may be embodiments of similar elements described above with reference to FIG. 1, and various features thereof may not be repeated below for the sake of brevity. For example, lithium-ion battery cell 210 may be an embodiment of lithium-ion battery cell 126.

Lithium-ion battery cell 210 may be utilized as an electric vehicle battery, a hybrid-electric vehicle battery, a consumer electronic device battery, or another type of battery. Illustration 200 shows that lithium-ion battery cell 210 may comprise cathode 220, separator 250, and anode 260. Cathode 220 may be an embodiment of cathode 116. Separator 250 may be an embodiment of separator 118. Anode 260 may be an embodiment of anode 120.

As shown in illustration 200, cathode 220 may comprise cathode coating layer 230 and cathode current collector 228. Cathode coating layer 230 may comprise cathode active material 222, which may be an embodiment of cathode active material 102, and which may be in the form of particulates. The particulates may have a range of sizes or may be very close in size. Cathode active material 222 may be an active material suitable for use in a cathode, such as a lithium intercalating compound or a lithium accepting compound. Cathode active material 222 may be a high-nickel active cathode material such as NMC. For example, cathode active material 222 may have a general formula of $Li_aNi_xCo_yMn_{1-x-y}O_2$. The formula for NMC may be lithium-rich, so that a>1, or stoichiometric, so that a=1. In some embodiments, cathode active material 222 may be NCA, NCMA, spinel and layered structure $LiMn_xNi_{2-x}O_4$, or another high-nickel active cathode material, and/or one or more of any of their precursors, such as $Ni_xMn_yCo_{1-x-y}(OH)_2$. In some embodiments, cathode active material 222 may be a lithium iron phosphate, a lithium metal phosphate, a lithium bimetallic phosphate, a lithium multi-metallic phosphate, or another material comprising lithium and phosphate. In some embodiments, cathode active material 222 may be another type of material, or a blend of materials, and one or more of the materials comprising cathode active material 222 may be treated or coated in various ways prior to, or after, inclusion in cathode 220. For example, cathode active material 222 may comprise one or more of NMC, NCA, NCMA, a lithium metal phosphate, and a lithium multi-metallic oxide. In some examples, other active materials may be used.

In some embodiments, cathode coating layer 230 may comprise conductive additive 224, which may be an embodiment of conductive additive 104, and which may be in the form of particulates. Conductive additive 224 may be a compound comprising carbon and/or metal, and may increase an electronic conductivity of cathode 220. Conductive additive 224 may be up to 15% of a total weight of cathode coating layer 230 (described below). In some embodiments, conductive additive 224 may be 10% or less, or 5% or less, of the total weight of cathode coating layer 230. In some embodiments, conductive additive 224 may be 0-15%, or 0-5%, or 0-3%, or 0.05-15%, or 1-15%, or 1-10%, or 1-8%, or 2-3%, or 3-10%, or 3-8%, or 5-15%, or 5-10%, or 5-8% of the total weight of cathode coating layer 230. In one embodiment, conductive additive 274 may be 5% of the total weight of cathode coating layer 230.

In some embodiments, cathode coating layer 230 may comprise binder 226, which may be an embodiment of binder 106. Cathode active material 222, conductive additive 224, and binder 226 may be dispersed and mixed uniformly within the cathode coating layer 230. Binder 226 may bind together other components of cathode coating layer 230. For example, cathode active material 222 particles and conductive additive 224 may be bound by binder 226, such that cathode active material 222 particles are bound to one another and to conductive additive 224 by binder 226. In some embodiments, binder 226 may maintain adhesion between cathode active material 222 particles in cathode coating layer 230 and conductive additive 224 particles in cathode coating layer 230 via non-covalent bonding interactions (e.g., hydrogen bonding, van der Waals forces, etc.). Binder 226 may adhere to surfaces of cathode active material 222 and conductive additive 224 and thus may keep the particles in cathode coating layer 230 (e.g., cathode active material 222 particles, conductive additive 224 particles) electrically connected and bound together. In some embodiments, binder 226 may form a web or an interconnecting tangle of fibers which may hold particles in place. In this way, a particle not directly bound by binder 226 may remain connected with other particles in cathode coating layer 230. As such, binder 226 may provide cohesiveness to cathode coating layer 230. In some embodiments, binder 226 may maintain cohesion between cathode active material 222 particles in cathode coating layer 230 via non-covalent bonding interactions (e.g., hydrogen bonding, van der Waals forces, etc.). In additional or alternative embodiments, binder 226 may maintain cohesion between conductive additive 224 particles in cathode coating layer 230 via non-covalent bonding interactions (e.g., hydrogen bonding, van der Waals forces, etc.).

In some embodiments, binder 226 may adhere to a surface of cathode current collector 228. In illustration 200, cathode coating layer 230 is depicted on one side of cathode current collector 228. In some embodiments, however, cathode coating layer 230 may be on both sides of cathode current collector 228. By adhering to both cathode current collector 228 and particles of cathode coating layer 230, binder 226 may create adherence between cathode coating layer 230 particles and cathode current collector 228, such that cathode coating layer 230 particles are bound to one another and to cathode current collector 228 by binder 226. Such adherence may provide increased electronic conductivity throughout cathode 220.

Binder 226 may comprise an aromatic polyamide-based compound (e.g., PPB). In some embodiments, binder 226 may comprise a blend of PPB and PVDF. In some embodiments, binder 226 may comprise one or more other aromatic polyamide-based polymers, fibers, or resins in addition to, or instead of, PPB. As such, in some embodiments, binder 226 may comprise at least two compounds with differing compositions. As non-limiting examples, binder 226 may comprise one or more of poly(phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chloro-phenyleneterephthalamide), a phenyleneterephthalamide/2,6-chlorophenyleneterephthalamide multipolymer, poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide), and para-phenyleneterephthalamide/2,6-dichloro-para-phenyleneterephthalamide copolymer. In some embodiments, binder 226 may comprise any aromatic polyamide-based material that has been chemically altered, or chemically modified, to add or remove one or more functional groups or elements.

In some embodiments, binder 226 may comprise 0.01-100% PPB, or 0.01-80% PPB, or 0.01-50% PPB, or 0.01-20% PPB, or 0.01-10% PPB, and a remainder may be PVDF or a blend of PVDF and other binders, or a blend of other binders with no PVDF. In one embodiment, binder 226 may be 30-40% PPB. In some embodiments, PPB may be partially or wholly substituted with one or more other aromatic polyamide-based polymers, fibers, or resins.

Binder 226 may be present at greater than 0 wt % and less than or equal to 30 wt % of cathode coating layer 230. As non-limiting examples, binder 226 may be 0.01-30%, or 0.01-15%, or 0.01-5%, or 0.01-3%, or 0.01-2%, or 0.01-1%, or 0.01-0.5% of cathode coating layer 230. In some embodiments, binder 226 may be 1-5% or 3-5% of cathode coating layer 230.

In some embodiments, cathode 220 may comprise cathode current collector 228, which may be formed of a metal, such as aluminum. For example, cathode current collector 228 may be aluminum foil. Cathode current collector 228 may provide a conductive route for electrons moving to and from cathode coating layer 230. Cathode current collector 228 may be bound to cathode coating layer 230 by binder 226. Binder 226 may bind cathode coating layer 230 to cathode current collector 228 through a combination of forces such as van der Waals forces, hydrogen bonding, and other forces (e.g., mechanical forces), thereby maintaining adhesion between cathode coating layer 230 and cathode current collector 228. In some embodiments, binder 226 may maintain adhesion between cathode active material 222 particles in cathode coating layer 230 and cathode current collector 228 via non-covalent bonding interactions (e.g., hydrogen bonding, van der Waals forces, etc.). In some embodiments, binder 226 may maintain adhesion between conductive additive 224 particles in cathode coating layer 230 and cathode current collector 228 via non-covalent bonding interactions (e.g., hydrogen bonding, van der Waals forces, etc.). Binder 226 may provide stronger adherence between cathode coating layer 230 and cathode current collector 228 than a binder comprising 100% PVDF or a blend of binders that does not comprise PPB or another aromatic polyamide-based polymer, fiber, or resin.

Lithium-ion battery cell 210 may further comprise anode 260. Anode 260 may comprise anode coating layer 270 and anode current collector 278. Anode coating layer 270 may comprise anode active material 272, which may be in the form of particulates. The particulates may have a range of sizes or may be very close in size. Anode active material 272 may be an active material suitable for use in an anode, such as a lithium intercalating compound or a lithium accepting compound. Anode active material 272 may be carbon in the form of graphite or another form of carbon. In some embodiments, anode active material 272 may comprise silicon or another element, or a blend of elements or compounds. In some embodiments, anode active material 272 may be another type of material, or a blend of materials, and one or more of the materials may be treated or coated in various ways prior to, or after, inclusion in anode 260. For example, anode active material 272 may comprise one or more of lithium metal, graphite, graphene, LTO, silicon, a silicon oxide, tin, and a tin oxide. In some examples, other active materials may be used.

In some embodiments, anode coating layer 270 may comprise conductive additive 274, which may be an embodiment of conductive additive 104, and which may be in the form of particulates. Conductive additive 274 may be a compound or compounds comprising carbon, and may increase an electronic conductivity of anode 260. Conductive additive 274 may be up to 15% of a total weight of anode coating layer 270 (described below). In some embodiments, conductive additive 274 may be 10% or less, or 5% or less, of the total weight of anode coating layer 270. In some embodiments, conductive additive 274 may be 0-15%, or 0-5%, or 0-3%, or 0.05-15%, or 1-15%, or 1-10%, or 1-8%, or 2-3%, or 3-10%, or 3-8%, or 5-15%, or 5-10%, or 5-8% of the total weight of anode coating layer 270. In one embodiment, conductive additive 274 may be 5% of the total weight of anode coating layer 270. Conductive additive 274 may be dry mixed or wet mixed with anode active material 272 and binder 276. In some embodiments, conductive additive 274 may be the same as conductive additive 224.

In some embodiments, anode coating layer 270 may comprise binder 276. Anode active material 272, conductive additive 274, and binder 276 may be dispersed and mixed uniformly within the anode coating layer 270. Binder 276 may bind together other components of anode coating layer 270. For example, anode active material 272 particles and conductive additive 274 may be bound by binder 276, such that anode active material 272 particles are bound to one another and to conductive additive 274 by binder 276. In some embodiments, binder 276 may maintain adhesion between anode active material 272 particles in anode coating layer 270 and conductive additive 274 particles in anode coating layer 270 via non-covalent bonding interactions (e.g., hydrogen bonding, van der Waals forces, etc.). Binder 276 may adhere to surfaces of anode active material 272 and conductive additive 274 and thus may keep the particles in anode coating layer 270 (e.g., anode active material 272 particles, conductive additive 274 particles) electrically connected and bound together. In some embodiments, binder 276 may form a web or an interconnecting tangle of fibers which may hold particles in place. In this way, a particle not directly bound by binder 276 may remain connected with other particles in anode coating layer 270. As such, binder 276 may provide cohesiveness to anode coating layer 270. In some embodiments, binder 276 may maintain cohesion between anode active material 272 particles in anode coating layer 270 via non-covalent bonding interactions (e.g., hydrogen bonding, van der Waals forces, etc.). In additional or alternative embodiments, binder 276 may maintain cohesion between conductive additive 274 particles in anode coating layer 270 via non-covalent bonding interactions (e.g., hydrogen bonding, van der Waals forces, etc.).

In some embodiments, binder 276 may adhere to a surface of anode current collector 278. In illustration 200, anode coating layer 270 is depicted on one side of anode current collector 278. In some embodiments, however, anode coating layer 270 may be on both sides of anode current collector 278. By adhering to both anode current collector 278 and particles of anode coating layer 270, binder 276 may create adherence between anode coating layer 270 particles and anode current collector 278, such that anode coating layer 270 particles are bound to one another and to anode current collector 278 by binder 276. Such adherence may provide increased electronic conductivity throughout anode 260.

Binder 276 may comprise an aromatic polyamide-based compound (e.g., PPB). In some embodiments, binder 276 may comprise a blend of PPB and PVDF. In some embodiments, binder 276 may comprise one or more other aromatic polyamide-based polymers, fibers, or resins. As such, in some embodiments, binder 276 may comprise at least two compounds with differing compositions. As non-limiting examples, binder 276 may comprise one or more of poly (phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chlorophenyleneterephthalamide), a phenyleneterephthalamide/2,6-chlorophenyleneterephthalamide multipolymer, poly (para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide), and para-phenyleneterephthalamide/2,6-dichloro-para-phenyleneterephthalamide copolymer. In some embodiments, binder 276 may comprise any aromatic polyamide-based material that has been chemically altered, or chemically modified, to add or remove one or more functional groups or elements.

In some embodiments, binder 276 may be 0.01-100% PPB, or 0.01-80% PPB, or 0.01-50% PPB, or 0.01-20% PPB, or 0.01-10% PPB, and a remainder may be PVDF or a blend of PVDF and other binders, or a blend of other binders with no PVDF. In one embodiment, binder 276 may be 30-40% PPB. In some embodiments, PPB may be partially or wholly substituted with one or more other aromatic polyamide-based polymers, fibers, or resins. In some embodiments, binder 276 may have the same or a similar composition as binder 226.

In some embodiments, binder 276 may be present at greater than 0 wt % and less than or equal to 30 wt % of anode coating layer 270. As non-limiting examples, binder 276 may be 0.01-30%, or 0.01-15%, or 0.01-5%, or 0.01-3%, or 0.01-2%, or 0.01-1%, or 0.01-0.5% of anode coating layer 270. In some embodiments, binder 276 may be 1-5% or 3-5% of anode coating layer 270.

In some embodiments, anode 260 may comprise anode current collector 278, which may be formed of metal, such as copper. For example, anode current collector 278 may be copper foil. Anode current collector 278 may provide a conductive route for electrons moving to and from anode coating layer 270. Anode current collector 278 may be bound to anode coating layer 270 by binder 276. Binder 276 may bind anode coating layer 270 to anode current collector 278 through a combination of forces such as van der Waals forces, hydrogen bonding, and other forces, thereby maintaining adhesion between anode coating layer 270 and anode current collector 278. In some embodiments, binder 276 may maintain adhesion between anode active material 272 particles in anode coating layer 270 and anode current collector 278 via non-covalent bonding interactions (e.g., hydrogen bonding, van der Waals forces, etc.). In some embodiments, binder 276 may maintain adhesion between conductive additive 274 particles in anode coating layer 270 and anode current collector 278 via non-covalent bonding interactions (e.g., hydrogen bonding, van der Waals forces, etc.). Binder 276 may provide stronger adherence between anode coating layer 270 and anode current collector 278 than a binder comprising 100% PVDF or a blend of binders that does not comprise PPB or another aromatic polyamide-based polymer, fiber, or resin.

As shown in illustration 200, lithium-ion battery cell 210 may further comprise separator 250. Separator 250 may be a membrane which may electronically insulates cathode 220 and anode 260. Separator 250 may allow lithium ions to transport across from cathode 220 to anode 260 during a battery charge process, and back across from anode 260 to cathode 220 during a battery discharge process.

Figure 3:
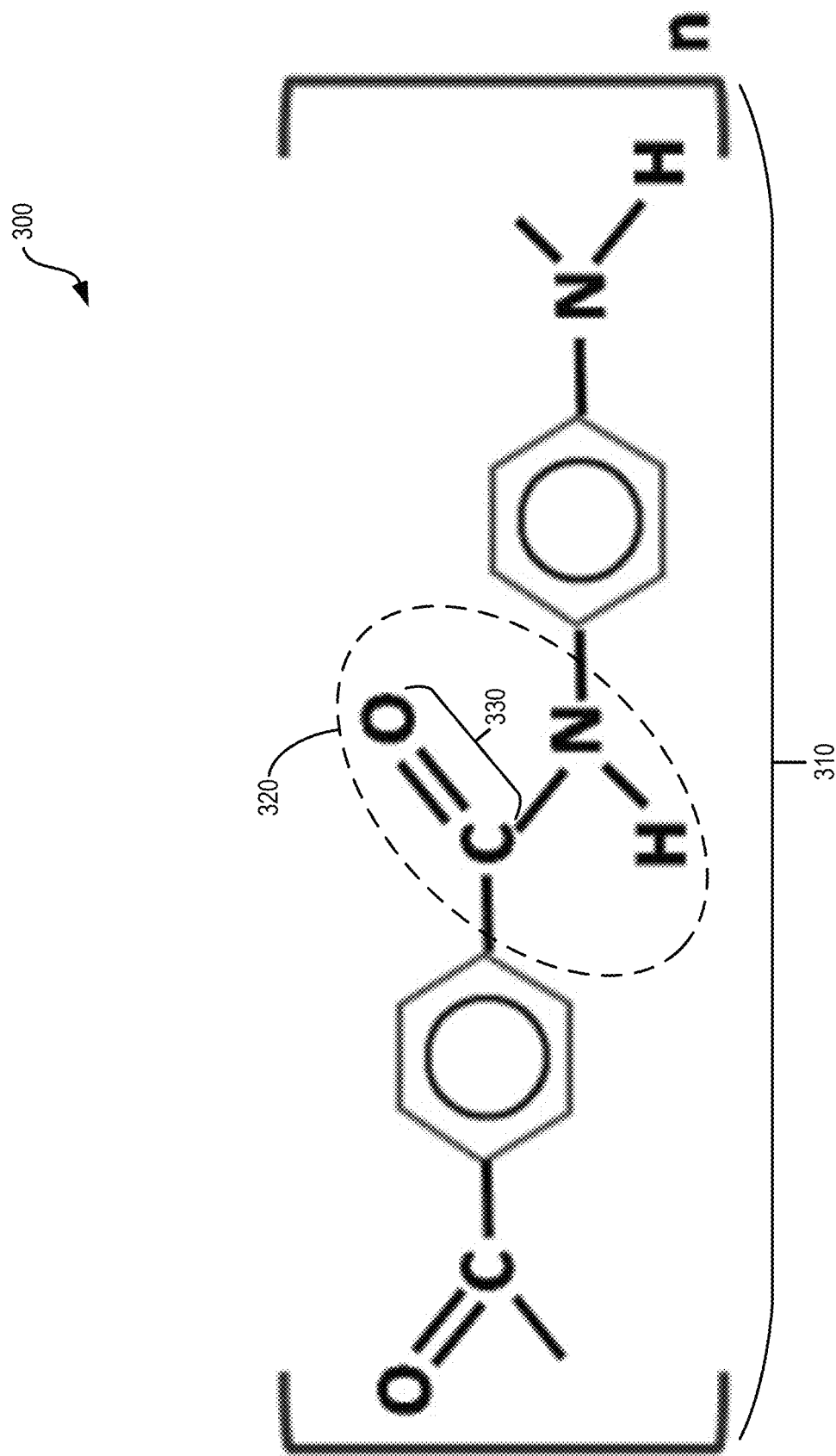
FIG. 3 shows a molecular structure of a PPB polymer.

Turning now to FIG. 3, chemical structure 300 is shown representing poly-p-benzamide. As shown in chemical structure 300, each PPB monomer 310 may comprise a —C(O)NH— group 320 comprising a C=O group 330. The —C(O)NH— group 320 may be polarized thereby ensuring a lower LUMO electronic state, which may improve polymer adhesion and interfacial interaction between binders 226, 276, particles of active materials 222, 272, and conductive additives 224, 274, and which may further lead to stronger adhesion between cathode coating layer 230 and cathode current collector 228, and between anode coating layer 270 and anode current collector 278. Addition of PPB into electrodes 220, 260 may significantly increase adhesion, cohesion, and integrity (e.g., the PPB may reduce cracking) of electrodes 220, 260. Moreover, capacity, cycle life, and mechanical strength of electrodes 220, 260 with added PPB may be improved without increasing electrode impedance.

Figure 4B:
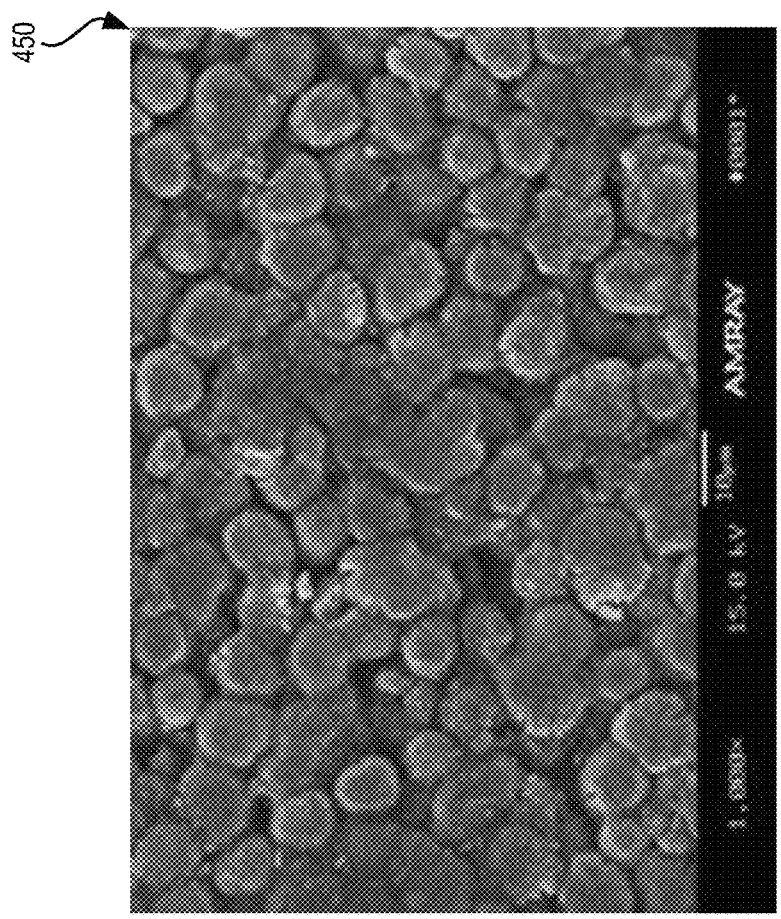
FIGS. 4A and 4B show scanning electron microscope (SEM) images of PPB fibers.
Figure 4A:
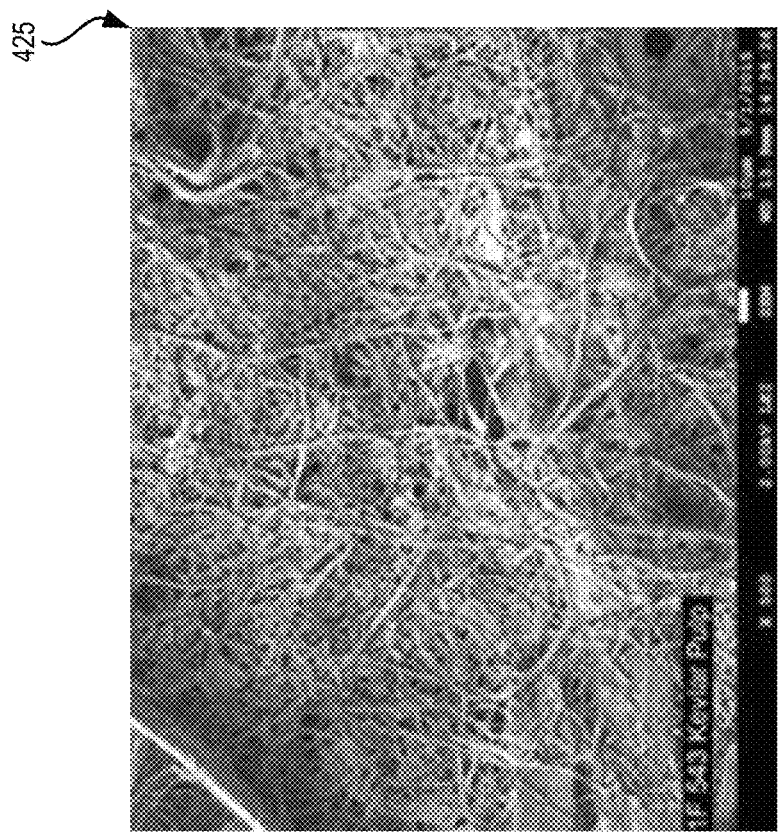

Turning now to FIGS. 4A and 4B, image 425 is a scanning electron microscope (SEM) image at 500× magnification showing a morphology of PPB as fibers with diameters of a few microns and lengths of hundreds of microns. Image 450 is an SEM image at 1000× magnification showing a morphology of a cathode with 1% PPB additive. As shown in image 450, the PPB fibers are well dispersed in the cathode, such that there is no obvious PPB aggregation observed therein.

Figure 5:
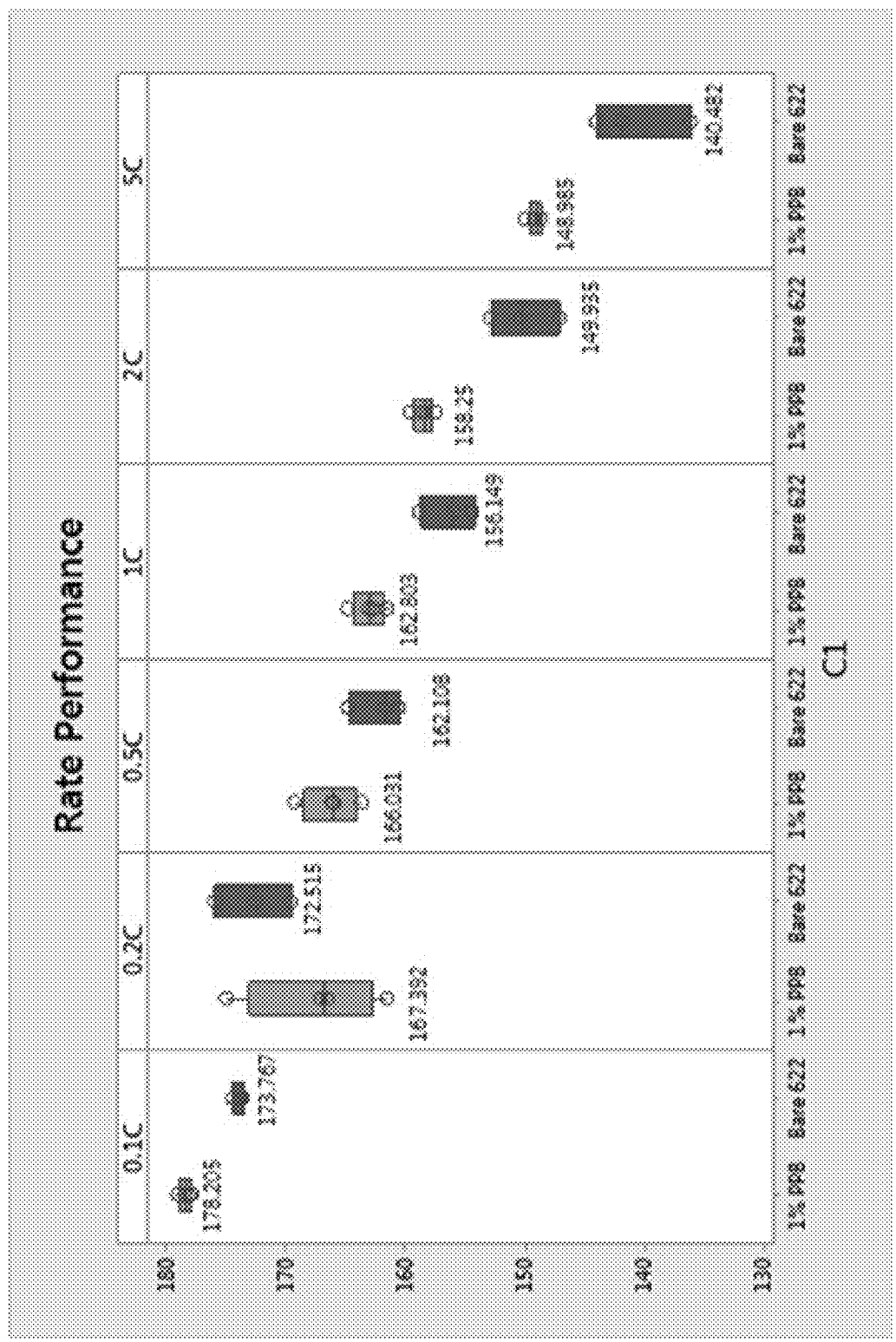
FIG. 5 shows a chart showing capacities in mAh/g of $LiNi_{0.6}Mn_{0.2}Co_{0.2}O_2$ (NMC622) cathodes with and without 1% PPB.

Turning now to FIG. 5, chart 500 shows capacities, in mAh/g, of $LiNi_{0.6}Mn_{0.2}Co_{0.2}O_2$ (NMC622) cathode samples with and without 1% PPB. Chart 500 shows that at 0.1 C, the cathode sample with 1% PPB has 178.2 mAh/g capacity compared to 173.8 mAh/g capacity of the cathode sample without PPB. The capacity may thus increase 4.4 mAh/g due to addition of 1% PPB. The increase may be because of increased cohesion of a coating layer in the cathode sample with 1% PPB, which may further permit loose particles and/or particle debris to be effectively utilized. Alternatively, the loose particles or particle debris may not be used due to lack of contact with neighboring particles in the cathode sample without PPB. With increasing discharge rate, the capacity of both cathode samples may drop, as shown in chart 500. However, the capacity of the cathode sample with 1% PPB is shown to be higher than the cathode sample without PPB at rates of 0.1 C, 1 C, 2 C, and 5 C, which may indicate that resistance of the cathode sample with 1% PPB may not be significantly increased.

Figure 6:
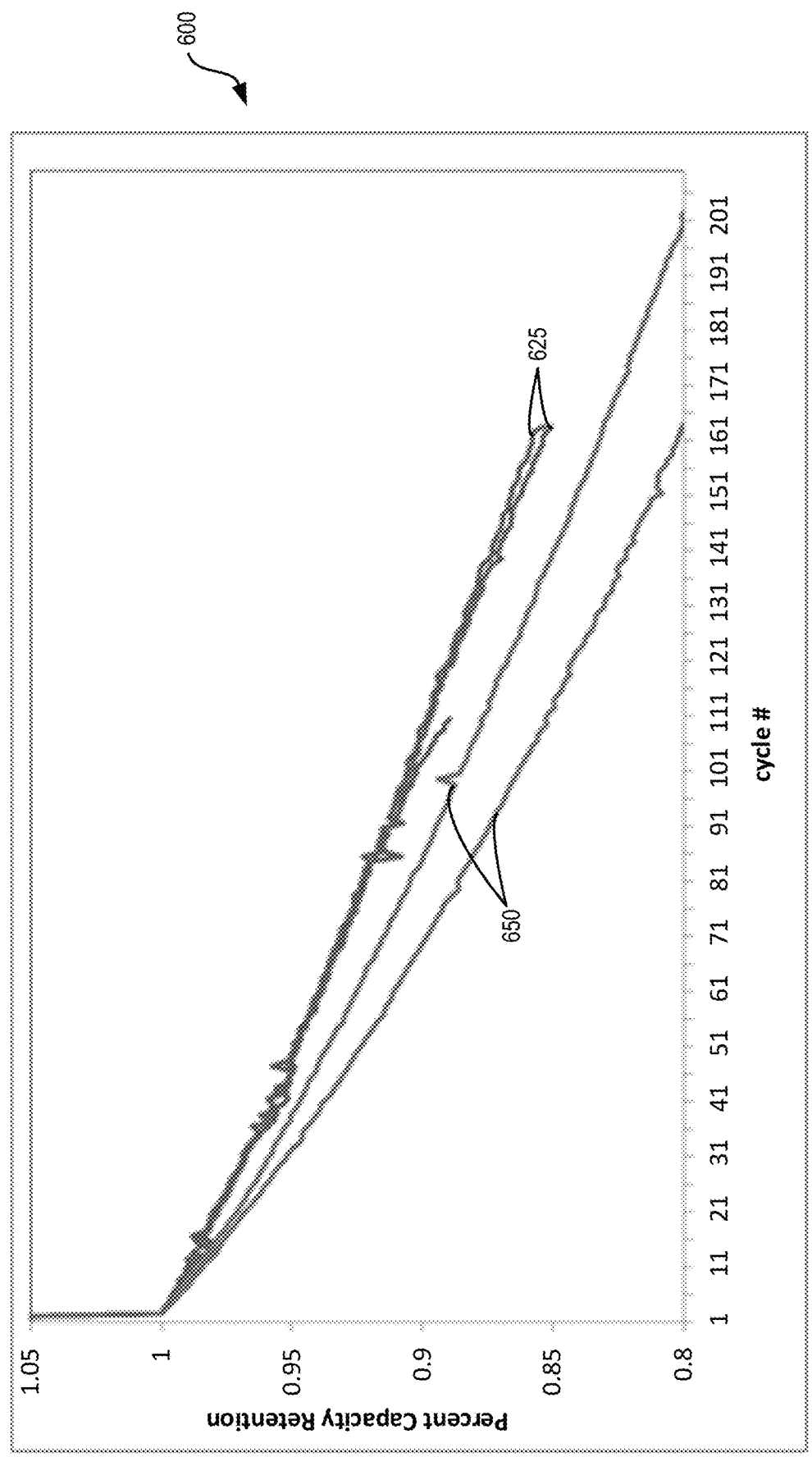
FIG. 6 shows a graph plotting a cycle lives of $LiNi_{0.8}Mn_{0.1}Co_{0.1}O_2$ (NMC811) with and without 1% PPB.

Turning now to FIG. 6, a graph 600 depicts cycle lives of $LiNi_{0.8}Mn_{0.1}Co_{0.1}O_2$ (NMC811) cathode samples with and without 1% PPB. As shown in set of curves 625, the NMC811 cathode samples with 1% PPB shows about 90% capacity retention at around 100 cycles. Set of curves 650 shows that a baseline capacity retention of NMC811 without PPB drops to about 90% at around 85 cycles. Such capacity degradation during cycling may be due to active material degradation, lithium depletion, loss of active material particles, and loss of adhesion between an active material coating and a metal current collector respectively included in the cathode samples. Polarized —C(O)NH— groups in PPB additives may enhance cohesion between the active material particles and the metal current collectors, leading to increased adhesion. The enhanced cohesion between particles may keep a film, or coating layer, including the active material particles intact and may further prevent loose active material particles detaching from the film, leading to a loss of electrical contact and thereby becoming inactive. The enhanced adhesion between the coating layer and the metal current collector may prevent detachment of the coating layer from the metal current collector and may result in longer cycle life.

Both maintaining cohesion and maintaining adhesion may keep direct current internal resistance (DCIR) from growing during cycling. As shown in graph 600, set of curves 625 is more clustered than set of curves 650. PPB additives may help duplicated samples have closely similar performance data to each other as compared to non-PPB counterparts. Such similar performance may be because fewer loose particles and stronger adhesion due to the PPB additive may lead to less randomness in capacity drop.

Figure 7:
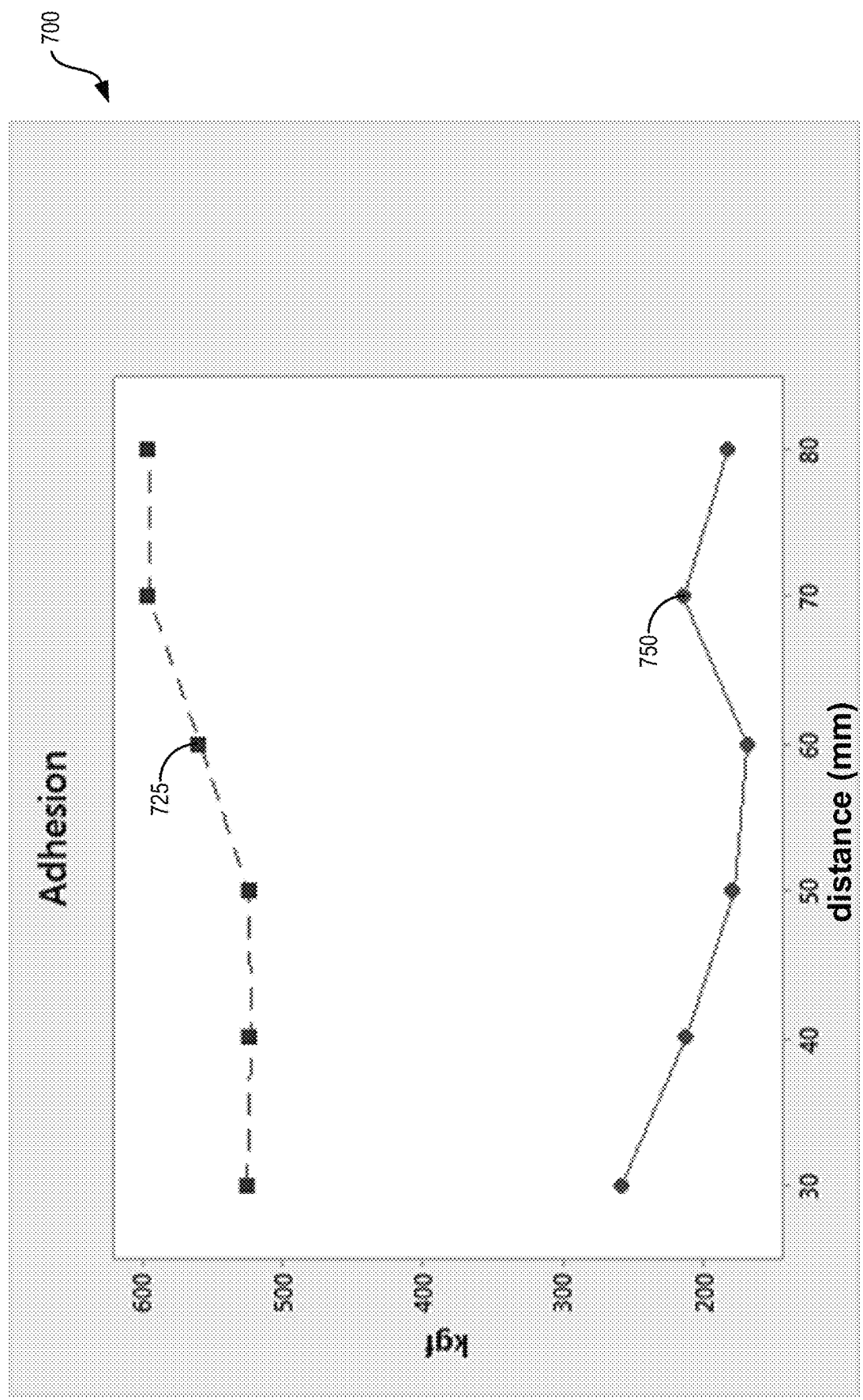
FIG. 7 shows a graph plotting an adhesion of NMC811 electrodes with and without 2% PPB.

Use of PPB as a binder may improve adhesion between electrode coating layers and current collectors. FIG. 7, for example, depicts graph 700, which plots results from an Instron® testing instrument. Specifically, graph 700 plots strengths of adhesion between active coating layers and current collectors in electrode samples with and without 2% PPB at different distances. To obtain the results, 1×6 inch electrode sample strips were attached to a stainless steel plate firmly by double-sided tape with an active coating layer facing the tape on the plate. Current collector was correspondingly attached to a moving arm of the Intron® testing instrument and were peeled from one end of the electrode sample. The moving arm peeled the current collector off the active coating layer at a rate of 5 mm/min. A force used to peel the current collector off the active coating layer was recorded every 10 mm, starting from a distance of 30 mm up to a distance of 80 mm. Graph 700 shows increased adhesion of the electrode sample with 2% PPB added. With added PPB, the adhesion of the active coating layer to the current collector (e.g., aluminum foil) is shown to increase from around 200 kgf to over 500 kgf throughout the distances employed, from 30 mm to 80 mm. Such superior adhesion may be due to enhanced adhesive forces of —C(O)NH— groups of PPB compared to, for example, van der Waals forces of another binder, such as PVDF.

Figure 8:
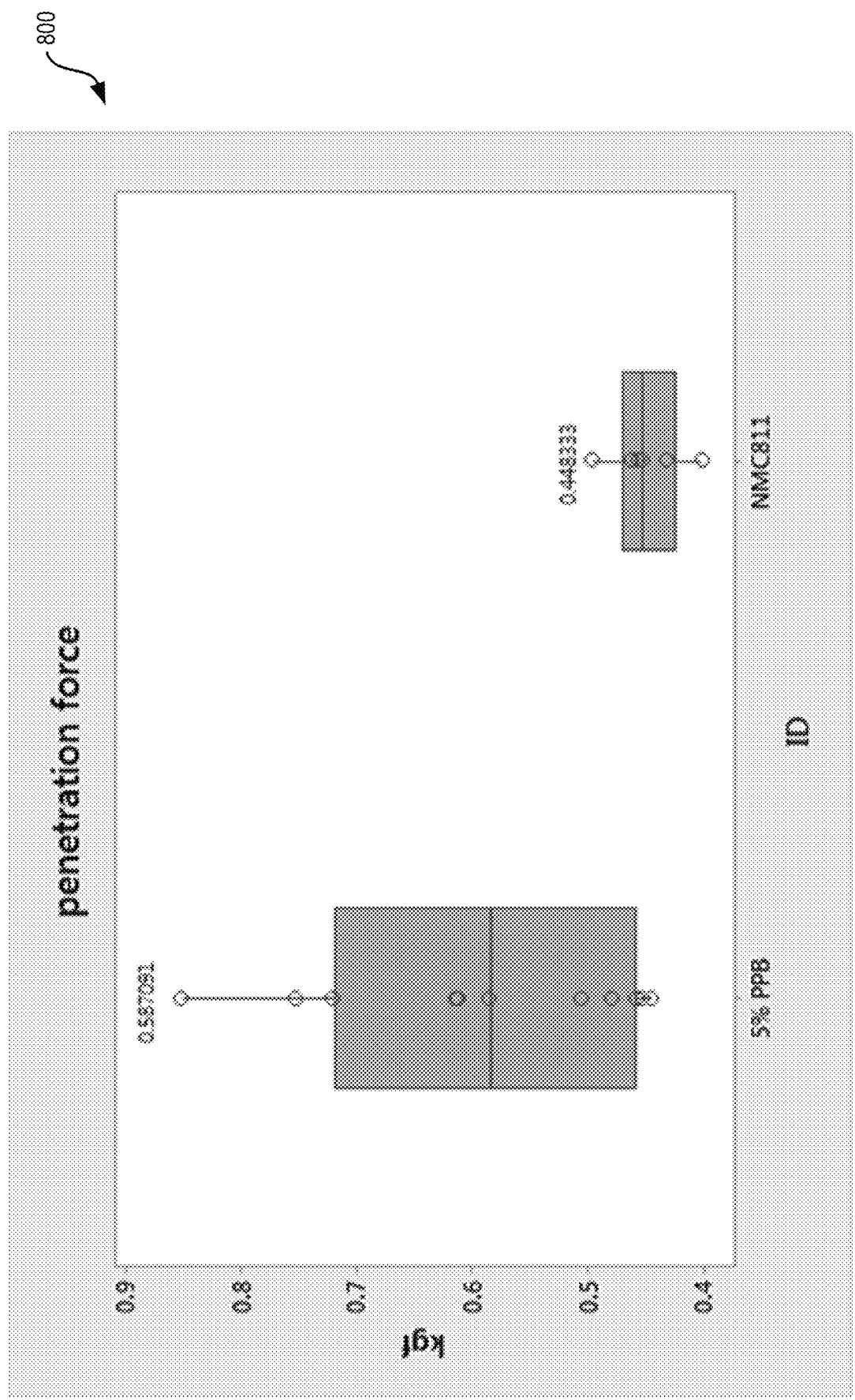
FIG. 8 shows a chart showing results of penetration tests on NMC811 electrodes with and without 5% PPB.

Use of PPB as an additive in electrodes may further increase both mechanical strength and resistance to penetration of the electrode. As an example, FIG. 8 depicts chart 800, which plots mechanical strengths of cathodes with and without 5% PPB, as tested by an Instron® testing instrument which may measure a force needed to penetrate through the respective electrode samples. A rod used to penetrate the electrode samples may be a blunt end 2 mm diameter stainless steel rod. A speed at which the rod penetrated through the electrode samples may be 2 mm/sec. The electrode samples may be placed on a platform with a round opening at a center thereof whereby the rod may penetrate the electrode samples. Chart 800 shows results from two sets of nine duplicated NMC811 cathode samples (with and without 5% PPB). The cathode samples without PPB may have a mean penetration force of 0.45 kgf, while the cathode samples with 5% PPB showed a 31% increase in mean penetration force at 0.59 kgf. A large spread of penetration force values of cathode samples with PPB may be due to an uneven dispersion of the PPB in the cathode samples. The penetration force may be unevenly distributed, such as higher where PPB fibers are more concentrated, and weaker where PPB fibers are less concentrated. A relative evenness of PPB dispersion in the cathode samples may be increased by more thorough dispersion of PPB in a cathode coating slurry resulting in an active coating layer of a given cathode sample through various dispersion techniques, such as prolonging a dispersion time, increasing a shear force during mixing, adding additives to help PPB disperse, etc. Less spread in nail penetration forces may be expected when PPB fibers are more uniformly dispersed in cathode samples, which may indicate uniform enhancement of mechanical strength throughout a given cathode sample.

Figure 9:
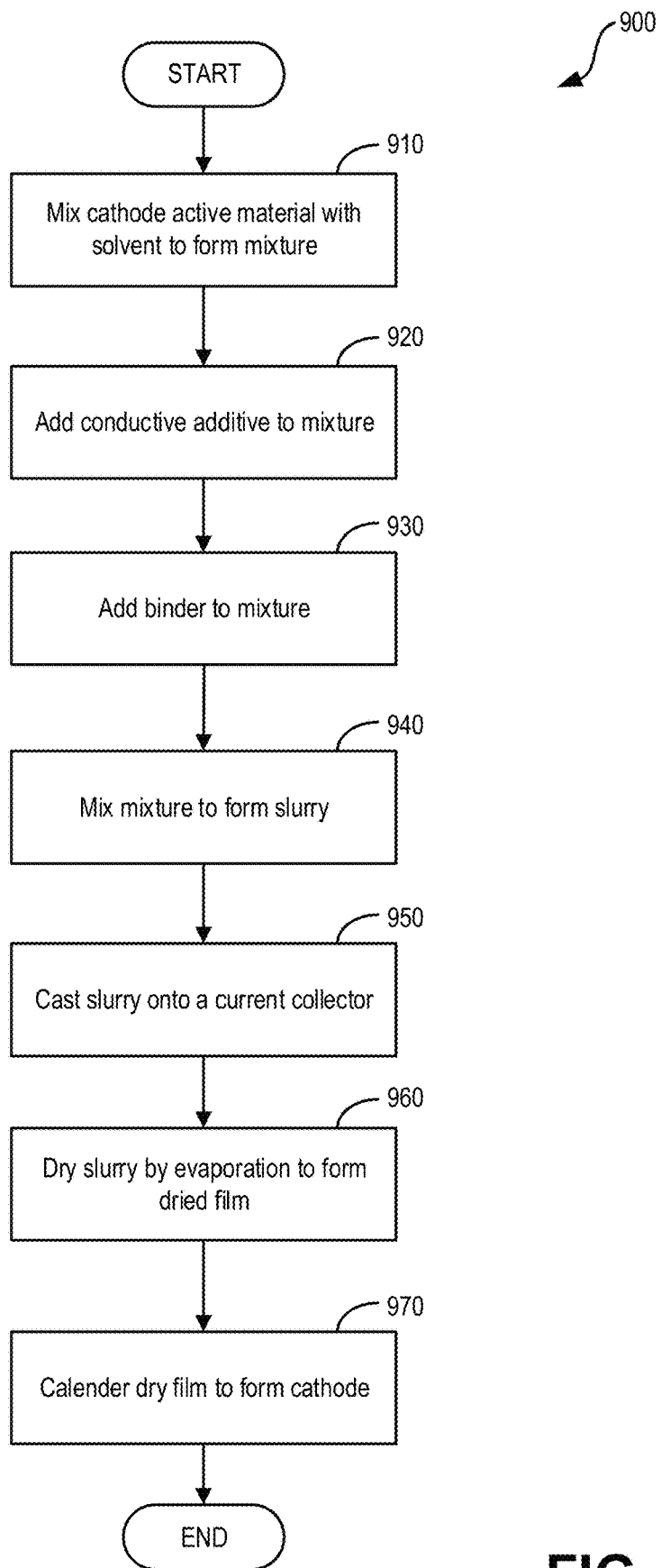
FIG. 9 shows a first example method for incorporating PPB into an electrode.
Figure 10:
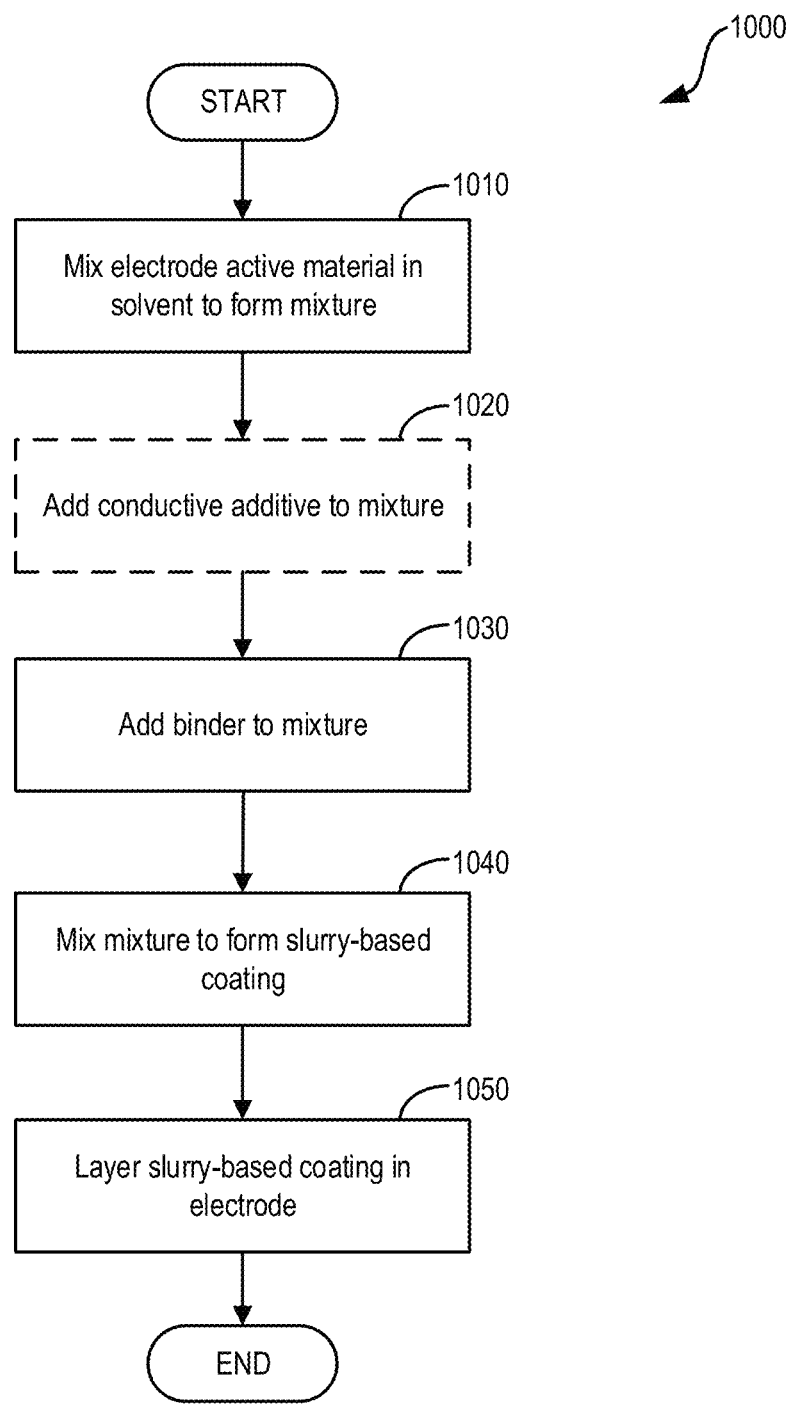
FIG. 10 shows a second example method for incorporating PPB into the electrode.

Turning now to FIGS. 9 and 10, two example methods are provided for incorporating an aromatic polyamide-based compound, such as PPB, as a binder in an electrode. It should be understood that, though described as separate embodiments, elements of the example methods of FIGS. 9 and 10 may be combined with one another to obtain more specific embodiments.

Turning now to FIG. 9, a method 900 is provided for producing a cathode. Various elements described with reference to FIG. 9 may be the embodiments described above with reference to FIGS. 1 and 2, and various features thereof may not be repeated below for the sake of brevity. For example, the cathode may be cathode 220.

Method 900 may start at 910, which may comprise mixing cathode active material 222 into solvent 108 (e.g., NMP) to form a mixture. As an example, cathode active material 222 may be NMC powder. In one embodiment, cathode active material 222 may be NMC and solvent 108 may be NMP. In one embodiment, a quantity of NMC powder (e.g., cathode active material 222) may be added so as to be 94 wt % of solids in the mixture. In some embodiments, method 900 at 910 may comprise forming a dissolved NMC solution by dissolving cathode active material 222, which may be NMC, in solvent 108, which may be an organic solvent, such as NMP. In some embodiments, solvent 108 may be a blend of solvents. In some embodiments, solvent 108 may be water or a water-based solvent. In some examples, other solvents may be wholly or partially substituted for solvent 108. In some embodiments, solvent 108 may not be added, and method 900 may continue without solvent 108 such that remaining components are dry mixed. In some embodiments, anode active material 272 may be substituted for cathode active material 222 at 910 and throughout method 900.

At 920, conductive additive 224 may be added to the mixture. Conductive additive 224 may be carbon. A type of conductive additive 224 added is not particularly limited and may be any kind known by one skilled in the art. For example, conductive additive 224 may comprise graphite, graphene, ketjen black, carbon black, or another type of conductive carbon. Conductive additive 224 may include, wholly or partially, other conductive additives including, but not limited to, conductive polymers. In one embodiment, conductive additive 224 may be conductive carbon and may be added at a weight percentage between 0 and 15 wt %. For example, a percent by mass of conductive additive 224 may be between 0 and 15% of solids in the mixture. In another example, conductive additive 224 may be added at a weight percentage of about 5 to 10 wt %. In one embodiment, conductive additive 224 may be added at 5 wt %. In one embodiment, the conductive additive 224 may be added at 3 wt %.

At 930, binder 226 may be added to the mixture of cathode active material 222 and conductive additive 224. Binder 226 may be wholly PPB, a mix of PPB and PVDF, a mix of PPB and PVDF and one or more other binders, or a mix of PPB and one or more other binders with no PVDF. Binder 226 may be 0.01-100% PPB or another aromatic polyamide-based polymer, fiber, or resin. In some embodiments, binder 226 may be 1-90%, or 5-80%, or 10-70%, or 15-60%, or 20-50%, or 25-40% PPB or another aromatic polyamide-based compound. In one embodiment, binder 226 may be ⅓ PPB and ⅔ PVDF. In one embodiment, binder 226 may be ⅓ of one or more aromatic polyamide-based compounds and ⅔ one or more other binders. In some embodiments, a wt % of PPB in the mixture (e.g., cathode coating layer slurry 112) compared to all solids in the mixture may be 0-30 wt % to achieve a predetermined balance of electrical, adhesive, cohesive, and mechanical strength properties in finally formed electrodes. In one embodiment, PPB may be 1 wt % of a finally formed electrode coating layer. In some embodiments, PPB may be 0.01-30 wt %, or 0.01-5 wt %, or 1-3 wt % of a finally formed cathode or anode coating layer.

At 940, the mixture, which may comprise cathode active material 222, conductive additive 224, and binder 226, may be mixed to form a slurry, such as slurry 112. In one embodiment, slurry 112 may be mixed in a Thinky cup for 5 minutes at 2000 RPM. In some embodiments, slurry 112 may be mixed for another duration, such as 1 minute or 10 minutes, and/or at another speed, such as 1000 RPM or 2500 RPM.

At 950, the slurry (e.g., 112) may be cast, or deposited, onto cathode current collector 228 to form cathode coating layer slurry on a current collector 114. Cathode current collector 228 may be metal, such as aluminum, or another conductive material. In one embodiment, cathode current collector 228 may be aluminum foil. In one embodiment, cathode current collector 228 may be aluminum foil with a thickness of 10 μm. A slot-die coater, a doctor blade method, or other coating methods may be used during 950 to cast slurry 112 at a predetermined thickness. In one embodiment, slurry 112 may be cast with a drawdown applicator on an automatic drawdown table. In some embodiments, anode current collector 278 may be substituted for cathode current collector 228 at 950 and throughout method 900.

At 960, cathode coating layer slurry on a current collector 114 may be dried by evaporation to form a dried film. In one embodiment, cathode coating layer slurry on a current collector 114 may be heated to increase a speed of evaporation. For example, in one embodiment, cathode coating layer slurry on a current collector 114 may be heated in an oven at 80° C.

At 970, the dried film may be calendered to a predetermined density to form a cathode. For example, in one embodiment, the dried film may be calendered to a coating density of 3.2 g/cc to form cathode with PPB binder 116.

Although method 900 depicts formation of a cathode comprising PPB, techniques of method 900 may also be used to produce an anode comprising PPB. For example, an anode comprising PPB may be formed using the techniques outlined in method 900 and having a composition, as a nonlimiting example, of 1% PPB, 95% graphite powder (e.g., an anode active material), 2% other binder, and 2% conductive additives resulting from a slurry comprising such components.

Turning now to FIG. 10, a method 1000 is provided for producing an electrode, such as a cathode or an anode. Various elements described with reference to FIG. 10 may be the embodiments described above with reference to FIGS. 1 and 2, and various features thereof may not be repeated below for the sake of brevity. For example, the electrode may be cathode 220 or anode 260.

Method 1000 may start at 1010, which may comprise mixing an electrode active material (e.g., cathode active material 222, anode active material 272) in a solvent (e.g., 208) to form a mixture. In one embodiment, the electrode active material may be a cathode active material such as NMC, and the solvent may be NMP. In some embodiments, method 1000 at 1010 may comprise forming a dissolved NMC solution by dissolving the electrode active material, which may be the NMC powder, in the solvent, which may be NMP, or another solvent (e.g., water or an aqueous solvent), or a blend of solvents. In one embodiment, the NMC powder may be added so as to be about 94 wt % of solids in the mixture. In some embodiments, the solvent may not be added, such that method 1000 may continue without the solvent. In such embodiments, remaining components may be dry mixed. In some embodiments, the electrode active material may be an anode active material, such as lithium metal.

At 1020, a conductive additive (e.g., 224, 274) may optionally be added to the mixture including the electrode active material (e.g., cathode active material 222, anode active material 272). The conductive additive may be carbon. A type of the conductive additive is not particularly limited and may be any kind known by one skilled in the art, such as graphite, graphene, ketjen black, carbon black, conductive polymers, a combination thereof, etc. In one embodiment, the conductive additive may be added so as to be greater than 0 wt % and less than or equal to 15 wt % of solids in the mixture.

At 1030, a binder (e.g., 226, 276) may be added to the mixture including the electrode active material (e.g., cathode active material 222, anode active material 272). In some embodiments, the binder may be an aromatic polyamide-based compound. In such embodiments, the aromatic polyamide-based compound may be greater than 0% and less than or equal to 30% of a total weight of the mixture, or of a finally formed slurry-based coating. As an example, the binder may be PPB. In some embodiments, the binder may be wholly PPB, a mix of PPB and PVDF, a mix of PPB and PVDF and one or more other binders, or a mix of PPB and one or more other binders with no PVDF. In some embodiments, PPB may be added so as to be greater than 0 wt % and less than or equal to 30 wt % of solids in the mixture to achieve a predetermined balance of electrical, adhesive, cohesive, and mechanical strength properties in finally formed electrodes. In some embodiments, PPB may be between 0.01 and 30 wt % of a finally formed electrode coating layer. In one embodiment, PPB may be 1 wt % of a finally formed electrode coating layer. In some embodiments, the conductive additive (e.g., 224, 274) may optionally be added to the mixture before the binder has been added, such that 1020 may occur before 1030 in method 1000. In other embodiments, the conductive additive may optionally be added to the mixture after the binder has been added, such that 1020 may occur after 1030 in method 1000.

At 1040, the mixture, which may comprise one or more of the electrode active material (e.g., cathode active material 222, anode active material 272), the conductive additive (e.g., 224, 274), and the binder (e.g., 226, 276), may be mixed to form a slurry-based coating. In one embodiment, the mixture may be mixed in a Thinky cup for 5 minutes at 2000 RPM. In some embodiments, the mixture may be mixed for another duration, such as 1 minute or 10 minutes, and/or at another speed, such as 1000 RPM or 2500 RPM.

At 1050, the slurry-based coating may be layered in an electrode. The electrode may be a cathode or an anode. In some embodiments, the slurry-based coating may be cast, or deposited, onto a current collector (e.g., cathode current collector 228, anode current collector 278), dried, and calendered to a coating density of about 3.2 g/cc, for example, to obtain the electrode. Any method, or combination of methods, of casting, drying, and calendering may be employed by one skilled in the art to obtain desired layering of the slurry-based coating.

In this way, a more durable, longer-lasting battery with improved cycle life may be achieved by adding poly-p-benzamide to an electrode for a lithium-ion battery. In particular, inclusion of PPB in an electrode may increase cohesion of electrode coating layer particles, and increase adhesion of an electrode coating layer to a current collector. Improving adhesion between electrode components may provide an electrode with improved cohesion at both first use and after multiple cycles. The improved cohesion may result in the technical effect of improving electrode cycle life.

In addition, electrodes comprising PPB as described herein provide improved abuse tolerance characteristics. For example, the electrodes may show improved performance during nail penetration abuse tests. In particular, cathodes comprising PPB as described herein may show improved abuse tolerance.

In one example, an electrode comprises a current collector, and an electrode coating layer, the electrode coating layer comprising an electrode active material and a binder, where the binder may comprise an aromatic polyamide-based compound, and the binder may be present at greater than 0 wt % and less than or equal to 30 wt % of the electrode coating layer. A first example of the electrode further includes wherein the aromatic polyamide-based compound comprises poly-p-benzamide. A second example of the electrode, optionally including the first example, further includes wherein the binder is composed of 30-40% poly-p-benzamide. A third example of the electrode, optionally including one or more of the first and second examples, further includes wherein the binder comprises at least two compounds with differing compositions. A fourth example of the electrode, optionally including one or more of the first through third examples, further includes wherein the electrode coating layer further comprises a conductive additive, where the conductive additive is present at greater than 0 wt % and less than or equal to 15 wt % of the electrode coating layer. A fifth example of the electrode, optionally including one or more of the first through fourth examples, further includes wherein the electrode active material is a lithium intercalating compound. An sixth example of the electrode, optionally including one or more of the first through fifth examples, further includes wherein the electrode active material is a lithium-intercalating cathode active material or a lithium-intercalating anode active material. A seventh example of the electrode, optionally including one or more of the first through sixth examples, further includes wherein the cathode active material comprises one or more of NMC, NCA, NCMA, a lithium metal phosphate, and a lithium multi-metallic phosphate. An eighth example of the electrode, optionally including one or more of the first through seventh examples, further includes wherein the anode active material comprises one or more of lithium metal, graphite, graphene, lithium titanium oxide, silicon, a silicon oxide, tin, and a tin oxide. A ninth example of the electrode, optionally including one or more of the first through eighth examples, further includes wherein the aromatic polyamide-based compound is chemically modified with one or more additional functional groups or has one or more functional groups removed. A tenth example of the electrode, optionally including one or more of the first through ninth examples, further includes wherein the binder is in a form of fibers having diameters in a first range of 1 nanometer to 5 microns and lengths in a second range of 1 nanometers to 900 microns.

In another example, a lithium-ion battery comprises a first electrode including an electrode active material, a current collector, and an aromatic polyamide-based compound, a second electrode, and a separator disposed between the first electrode and the second electrode. A first example of the lithium-ion battery further includes wherein each of the first electrode and the second electrode include PPB. A second example of the lithium-ion battery, optionally including the first example, further includes wherein one of the first electrode and the second electrode includes PPB, and a remaining one of the first electrode and the second electrode includes no PPB. A third example of the lithium-ion battery, optionally including one or more of the first and second examples, further includes wherein the aromatic polyamide-based compound binds particles of the electrode active material to one another. A fourth example of the lithium-ion battery, optionally including one or more of the first through third examples, further includes wherein the aromatic polyamide-based compound binds particles of the electrode active material to the current collector. A fifth example of the lithium-ion battery, optionally including one or more of the first through fourth examples, further includes wherein the lithium-ion battery is one of a plurality of lithium-ion batteries of a same configuration, and the plurality of lithium-ion batteries are included in a lithium-ion battery pack.

In yet another example, a method for fabricating an electrode comprises mixing an electrode active material in a solvent to form a mixture, adding an aromatic polyamide-based compound to the mixture, adding a conductive additive to the mixture, mixing the mixture to form a slurry-based coating, and layering the slurry-based coating in the electrode. A first example of the method further comprises adding a conductive additive to the mixture. A first example of the method further includes wherein layering the slurry-based coating in the electrode includes drying and calendering the slurry-based coating. A second example of the method, optionally including the first example, further includes wherein the aromatic polyamide-based compound is greater than 0% and less than or equal to 30% of a total weight of the slurry-based coating.

Various modifications of the present invention, in addition to those shown and described herein, will be apparent in the above description to those skilled in the art. Such modifications are also intended to fall within the scope of the appended claims. The foregoing description is illustrative of particular embodiments of the invention, but it is not meant to be a limitation upon the practice thereof. The foregoing discussion should be understood as illustrative and should not be considered limiting in any sense. While inventions have been particularly shown and described with references to preferred embodiments thereof, it will be understood by those skilled in the art that various changes in form and details may be made therein without departing from the spirit and scope of the inventions as defined by the claims. The corresponding structures, materials, acts and equivalents of all means or steps plus function elements in the claims below are intended to include any structure, material or acts for performing the functions in combination with other claimed elements as specifically claimed.

It will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An electrode, comprising:
a current collector; and
an electrode coating layer, the electrode coating layer comprising an electrode active material and a binder, wherein
the binder comprises an aromatic polyamide-based compound, wherein the aromatic polyamide-based compound comprises poly-p-benzamide, and
the binder is present at greater than 0 wt % and less than or equal to 30 wt % of the electrode coating layer.

2. The electrode of claim 1, wherein the binder is composed of 30-40% poly-p-benzamide.

3. The electrode of claim 1, wherein the binder comprises at least two compounds with differing compositions.

4. The electrode of claim 1, wherein the electrode coating layer further comprises a conductive additive, where the conductive additive is present at greater than 0 wt % and less than or equal to 15 wt % of the electrode coating layer.

5. The electrode of claim 1, wherein the electrode active material is a lithium intercalating compound.

6. The electrode of claim 5, wherein the electrode active material is a lithium intercalating cathode active material or a lithium intercalating anode active material.

7. The electrode of claim 6, wherein the lithium intercalating cathode active material comprises one or more of NMC, NCA, NCMA, a lithium metal phosphate, and a lithium multi-metallic phosphate.

8. The electrode of claim 6, wherein the lithium intercalating anode active material comprises one or more of graphite, graphene, lithium titanium oxide, silicon, a silicon oxide, tin, and a tin oxide.

9. The electrode of claim 1, wherein the binder is in a form of fibers having diameters in a first range of 1 nanometer to 5 microns and lengths in a second range of 1 nanometer to 900 microns.

10. The electrode of claim 1, wherein the binder is a blend of poly-p-benzamide and polyvinylidene fluoride.

* * * * *